United States Patent [19]

Kolell et al.

[11] 4,041,287

[45] Aug. 9, 1977

[54] FINAL SERVO CONTROL IN NC SYSTEMS

[75] Inventors: Norbert C. Kolell; John P. Conners, both of Fond du Lac, Wis.

[73] Assignee: Giddings & Lewis, Inc., Fond du Lac, Wis.

[21] Appl. No.: 721,404

[22] Filed: Sept. 8, 1976

[51] Int. Cl.² .............................................. G06F 15/46
[52] U.S. Cl. .............................. 235/151.11; 318/569; 364/300
[58] Field of Search .................... 235/151.11; 318/569

[56] References Cited

U.S. PATENT DOCUMENTS

| | | | |
|---|---|---|---|
| 3,656,124 | 4/1972 | McGee | 340/172.5 |
| 3,727,191 | 4/1973 | McGee | 340/172.5 |
| 3,941,987 | 3/1976 | Tack | 235/151.11 |

*Primary Examiner*—Eugene G. Botz

*Attorney, Agent, or Firm*—Leydig, Voit, Osann, Mayer & Holt, Ltd.

[57] ABSTRACT

An improved final servo control for numerical control systems of the type which perform linear and/or circular interpolation by iterative updating of commanded position signals. The improvements are embodied in means to sense when the servo loop has had an offset error introduced by drift or aging of the final amplifier or similar components, together with means for progressively and automatically removing such error; and by means to avoid attempts at extreme acceleration or deceleration beyond the ability of the servo power element (motor) to accomplish, —by creating from an iteratively updated primary position command signal, whose rate of change may suddenly alter by a wide margin, a secondary position command signal which varies ultimately by the same amount but at a lesser rate of change.

24 Claims, 10 Drawing Figures

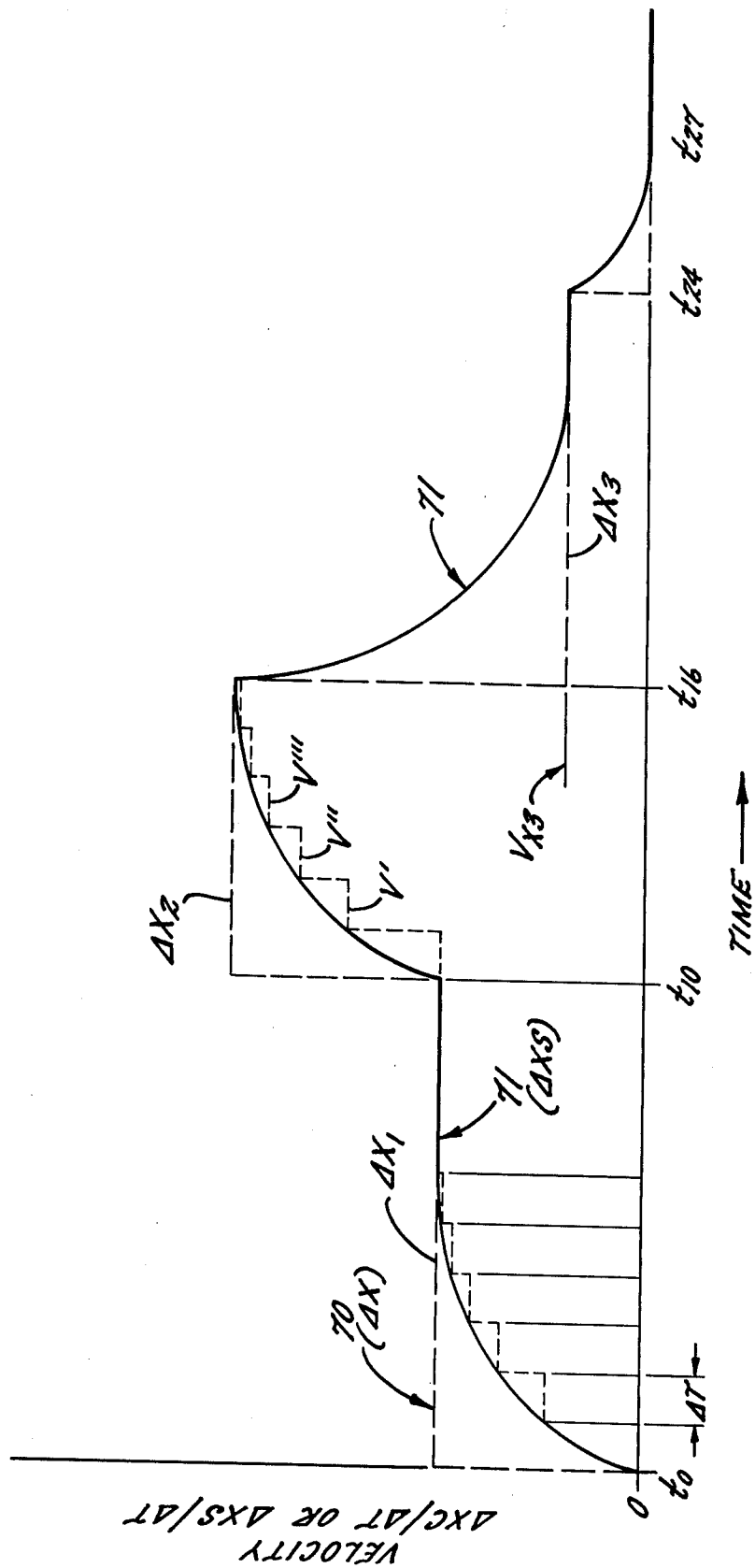

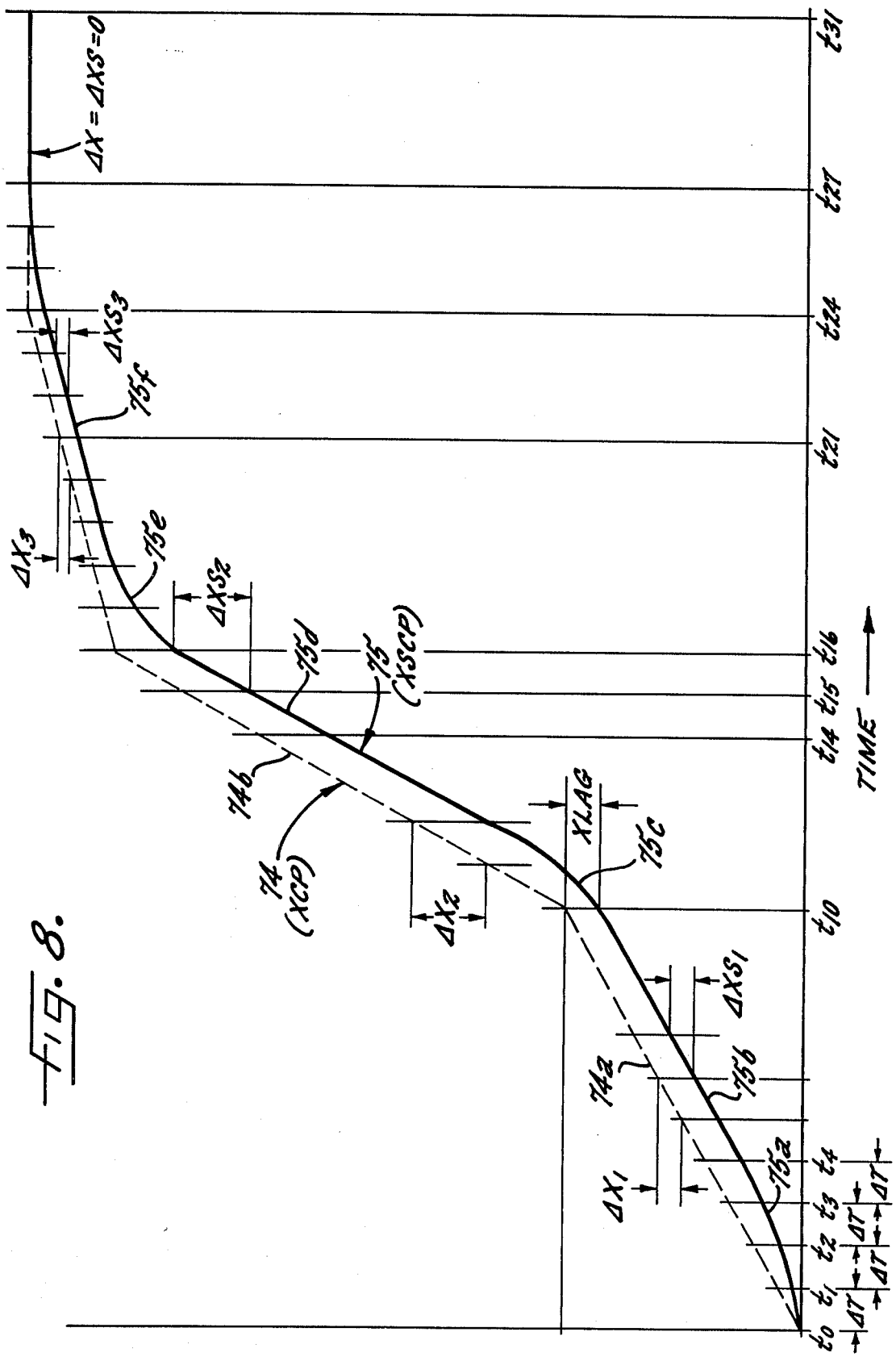

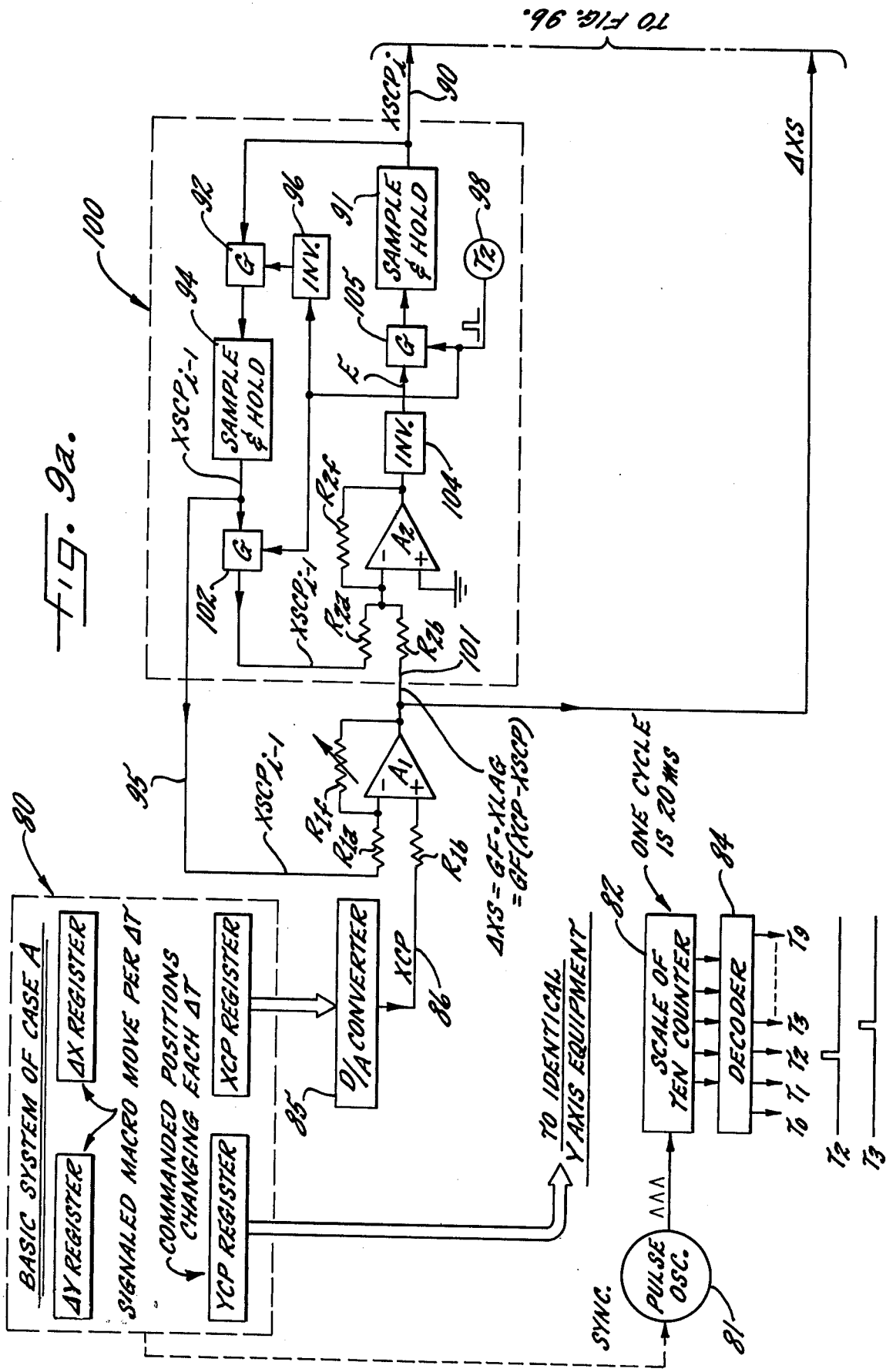

FINAL SERVO CONTROL IN NC SYSTEMS

CROSS REFERENCE TO RELATED PATENTS

Although no assertion is here made that the present application is entitled to benefit of a filing date earlier than its actual filing date, cross reference is here made to U.S. Pat. No. 3,656,124 issued Apr. 11, 1972 in the name of John K. McGee and assigned to the assignee of the subject application. Hereinafter such patent will be called "Case A" for brevity. As noted below, the cross reference is made to set forth the background of the present invention and to provide, without needless repetition here, detailed descriptive material—which is either helpful to an understanding of the improvements here to be disclosed or enabling as supporting some of the elements of the combinations to be claimed.

Cross reference is also made to U.S. Pat. No. 3,727,191 issued Apr. 10, 1973 in the name of John K. McGee and assigned to the assignee of the subject application. The latter patent will herein be called "Case B"; and reference thereto will aid the reader in understanding not only the basic systems to which the present invention brings significant inprovements but also the nature of, and a prior solution to, the problem of excessive acceleration or deceleration.

SUMMARY AND OBJECTIVES OF THE INVENTION

The present invention relates in general to numerical control systems and in particular to contouring or path systems for moving a member simultaneously along two or more axes according to a program ("part program") defining the direction, the distance and the feed rate of successive segments of an entire path to be traveled. Such numerical control systems are per se known in the art; they find use in controlling multi-axis machine tools but are equally well applied to other devices such as drafting machines, welding or flame cutting machines, painting or assembly robots, and so on.

This invention pertains more specifically to improvements in numerical control systems of the type in which the commanded position for the controlled member along one or more axes is represented by a primary command signal which is iteratively updated, during successive equal time periods, by an amount which is pre-established and which may change from period to period. In Case A, for example, position command signals XCP and YCP are changed during each successive short period $\Delta T$ (20 ms.) by amounts corresponding to signaled increment values $\Delta X$ and $\Delta Y$. By an optional but advantageous feature called "micromoving", corresponding input signals XSC and YSC to X and Y axis positioning servos are changed by $\Delta X/10$ and $\Delta Y/10$ during each of successive shorter periods $\Delta T/10$. But two problems remain in systems of that general type. The final amplifiers or related components in the servo loop might, as a result of temperature variations or aging, experience drifting or other changes which would leave the actual position of the controlled member offset slightly from the commanded position even when the servo error signal is reduced essentially to zero. Secondly, step changes in the updating signals or amounts $\Delta X$ and $\Delta Y$ could introduce such high rates of change in the position command signals (XCP, YCP or XSC, YSC) as to exceed the limited power elements' (motors) ability to track. In other words, part programs calling for high acceleration or deceleration along an axis could not be accurately executed.

Case B discloses one solution to the acceleration/deceleration problem, but involves a relatively extensive array of apparatus (storage registers) and consumes an appreciable portion of the time available during each $\Delta T$ iteration.

It is the general aim of the present invention to provide improvements in the creation of final signals applied to power servos of numerical control systems of the iteratively updating type.

More particularly, it is a primary object to alleviate or eliminate the "offset drift" problem in such systems by self-corrective action.

It is another object to alleviate or eliminate the problem of part program-commanded excessive acceleration or deceleration in such numerical control systems by apparatus and operations which are simpler, more economical and which consume less signal processing time during each iteration period.

In another sense, it is an objective to bring improvements to the final servo controls in numerical control systems —and which will enhance both accuracy and reliability of performance.

BRIEF DESCRIPTION OF THE DRAWINGS

These and other objects and advantages of the invention will become apparent as the following description proceeds in conjunction with the accompanying drawings, in which:

FIG. 7 is a graphic illustration of the manner in which the desired velocity signal for the final control element actually varies with time in comparison to the programmed velocities called for by a typical part program;

FIG. 8 is a graphical illustration of the manner in which the actual position of the controlled element varies with time as a result of the improvement of this invention, and as compared to the theoretical position versus time relationships designated by a typical part program; and FIGS. 9a and 9b, when joined along the indicated junction line, form a single FIG. 9 which illustrates a second embodiment of the present invention formed totally by hard-wired analog signal processing components.

Figure 1:
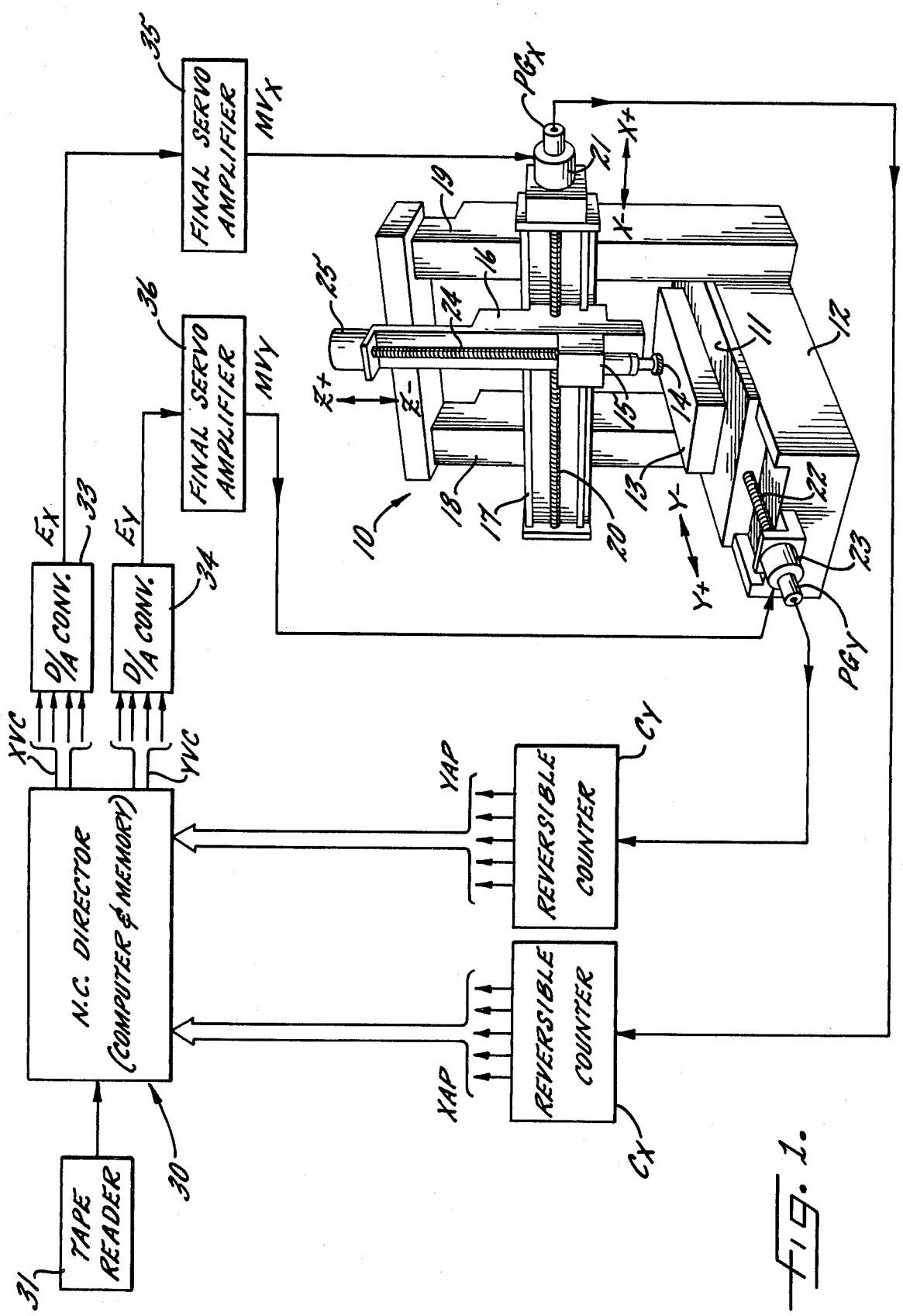
FIG. 1 is a generalized diagrammatic representation of a numerical control system and a controlled machine tool.

While the invention has been shown and will be described in some detail with reference to exemplary embodiments, there is no intention that it thus be limited to such detail. On the contrary, it is intended here to cover all modifications, alternatives and equivalents which fall within the spirit and scope of the invention as defined by the appended claims.

DESCRIPTION OF PREFERRED EMBODIMENTS

As noted above, the present invention comes as an improvement in numerical control systems which are per se well known to those skilled in the art. To make the invention more quickly understood, however, it will be helpful to set out briefly by way of review the basic organization and operation of one typical numerical contouring system before proceeding to the more detailed explanation of the novel improvement and its advantageous operations.

A. An Exemplary Machine Tool

In order to illustrate one particular environment in which the present invention will find especially advantageous use, it will be described here with reference to controlling paths described by an element of a numerically controlled milling machine along two mutually orthogonal axes. A milling machine 10 (shown in FIG. 1) is typical of the many different types of machine tools or other machines such as flame cutters, cloth cutters, drafting machines and the like which may be numerically controlled in response to successive blocks of command signals each representing one segment of a pre-programmed path. The exemplary milling machine includes a work table 11 movable horizontally along a bed 12 and adapted to carry a workpiece 13 which is to be machined to a desired contour in the X-Y plane. A rotary driven milling cutter 14 is mounted on, and vertically movable with, a ram 15 which is slidable within vertical ways (not shown) formed on a saddle 16, the latter in turn being movable horizontally along the ways of a rail 17 which is supported at its opposite ends by spaced columns 18 and 19. The cutting tool 14 may thus be moved along horizontal orthogonal X and Y axes relative to the workpiece 13 and in addition may be moved along vertical Z axis at right angles to the X horizontal axis.

By proper proportioning of the X, Y and Z axis components of commanded movement and velocity, the milling tool 14 moves through the workpiece 13 along a path and at a depth to cut a desired contour thereon. To produce such controlled movement of the workpiece 13 and the cutter 14, the saddle 16 includes a nut (not shown) engaged with a lead screw 20 driven through suitable gears (not shown) by a reversible servomotor 21. As the latter motor is caused to rotate in one direction or the other at different speeds, the saddle 16 will be moved horizontally in +X or −X directions and at velocities determined by the speed of the motor. Correspondingly, the ram 15 carries a nut (not shown) engaged with a vertically disposed lead screw 24 driven by a reversible servomotor 25 so that energization of that motor in one direction or the other moves the cutter 14 in +Z or −Z directions. Finally, the table 11 also carries a nut (not shown) which is engaged with a horizontally disposed lead screw 22 driven by a reversible servomotor 23 whereby the table 11 and the workpiece 13 thereon may be moved in +Y or −Y directions. To simplify the description which follows, only that part of the numerical control associated with the X and Y axis drive motors 21 and 23 will be illustrated. It will be understood by those skilled in the art, however, that such a control may be modified without departing from the scope of the invention to accommodate the third or Z axis servomotor 25 and indeed to control simultaneous motions along as many axes as might be desired.

Strictly speaking, in the machine 10 as shown, the cutter 14 moves along the X axis and the table 11 with the workpiece 13 moves along the Y axis. It is, however, the relative motion between the cutter and the workpiece which shapes the latter, and the same result would be obtained if the workpiece were stationary while the cutter moved along both X and Y axes. In the parlance of the art, therefore, the cutter 14 will here be referred to as the controlled member movable along one or more axes to follow a programmed path, and this is entirely correct when understood to refer to either the actual motions of the cutter or its motion relative to an associated part (workpiece).

The X and Y axis dc. motors 21 and 23 form the final power elements of X and Y axis servo systems. They are energized with voltages $MV_x$ and $MV_y$ which generally designate and are proportional to the individual axis velocities $V_x$ and $V_y$ at which the controlled member is to be moved. As a general matter these velocity-designating voltages are proportional to the error between a commanded position and an actual position, but contain additional components to be described. To signal the actual positions of the cutter along the X and Y axes many available and suitable types of position feedback devices may be adopted. Shown here by way of example only are pulse generators $PG_x$ and $PG_y$ driven by the lead screws 20 and 22 and supplying their outputs to respective reversible counters $C_x$ and $C_y$. As is well known, the counters count up or down (there being direction intelligence in the pulse generator outputs) as the member 14 moves in positive or negative directions along the X or Y axes. The plural output lines from each counter thereby carry bi-level voltages which in binary or BCD format dynamically represent numerically the instantaneous, actual positions of the member 14 along the X and Y axes. Such signals are here designated XAP and YAP.

B. An Exemplary Numerical Control System

For completeness, the specification and drawings in Case A are hereby incorporated by reference and made an integral part of the present disclosure. This will avoid the need for lengthy detail, and the brief review which follows is framed with the assumption that the reader is familiar with Case A.

Referring again to FIG. 1, a numerical control director 30 receives successive blocks of input signals which make up a "part program" defining a desired path which the member 14 is to travel. Each block of input signals defines one segment of the path, and the segments (which may be circular arcs or linear moves) are executed seriatim as the system responds to successive blocks. Although the blocks of input signals may be supplied successively from a part program static memory, the more conventional punched tape reader 31 is here illustrated as the source of such programmed input signals.

As each block of input signals is produced by the tape reader, the individual signals thereof are decoded for entry into the memory or storage units of the director 30. The last-received block is held in buffer portions of the memory while the preceding block, and signals derived therefrom, is held in active portions of the memory and utilized in the interpolation procedure to generate the final, changing velocity command signals XVC and YVC. When the active block has been fully executed, then the succeeding block is transferred to active memory and the next-succeeding block is brought into buffer storage from the tape reader 31.

Additionally, the numerical control system of FIG. 1 may include a visual display unit (not shown) which indicates to the operator the value of one or more of the signals stored or created in the director 30. By setting a selector knob, the operator may call up for display any of the various signals then held in the director 30. Since selectable visual displays are per se familiar to those skilled in the art, additional details are not required here. Also, the director 30 may include a keyboard (MDI) by which data may be entered manually into the various storage or memory locations.

The director 30 differs from that described in Case A by including the improvements embodying the present invention and to be hereinafter discussed in detail. As a preliminary matter, however, it may be noted that (unlike the final output signals XSC and YSC fed from the Case A director to X and Y servos—see FIGS. 7a, 9a, 9d, 9g in Case A) the final output signals from the director 30 are multi-bit binary signals XVC and YVC which change from instant to instant to represent numerically the finally commanded velocities $V_x$ and $V_y$ at which the controlled member is to be moved along the X and Y axes. These latter signals are fed to digital-to-analog converters 33, 34 of any suitable, well known type to create final dc. velocity-representing voltages $E_x$ and $E_y$. And such voltages are then passed through final amplifiers 35, 36 which thus transmit motor-energizing voltages $MV_x$ and $MV_y$ to the servo power elements here shown as the dc. motors 21 and 23. The motors drive their respective lead screws in directions and at speeds corresponding to the polarity and magnitude of the voltages $MV_x$ and $MV_y$.

Figure 2:
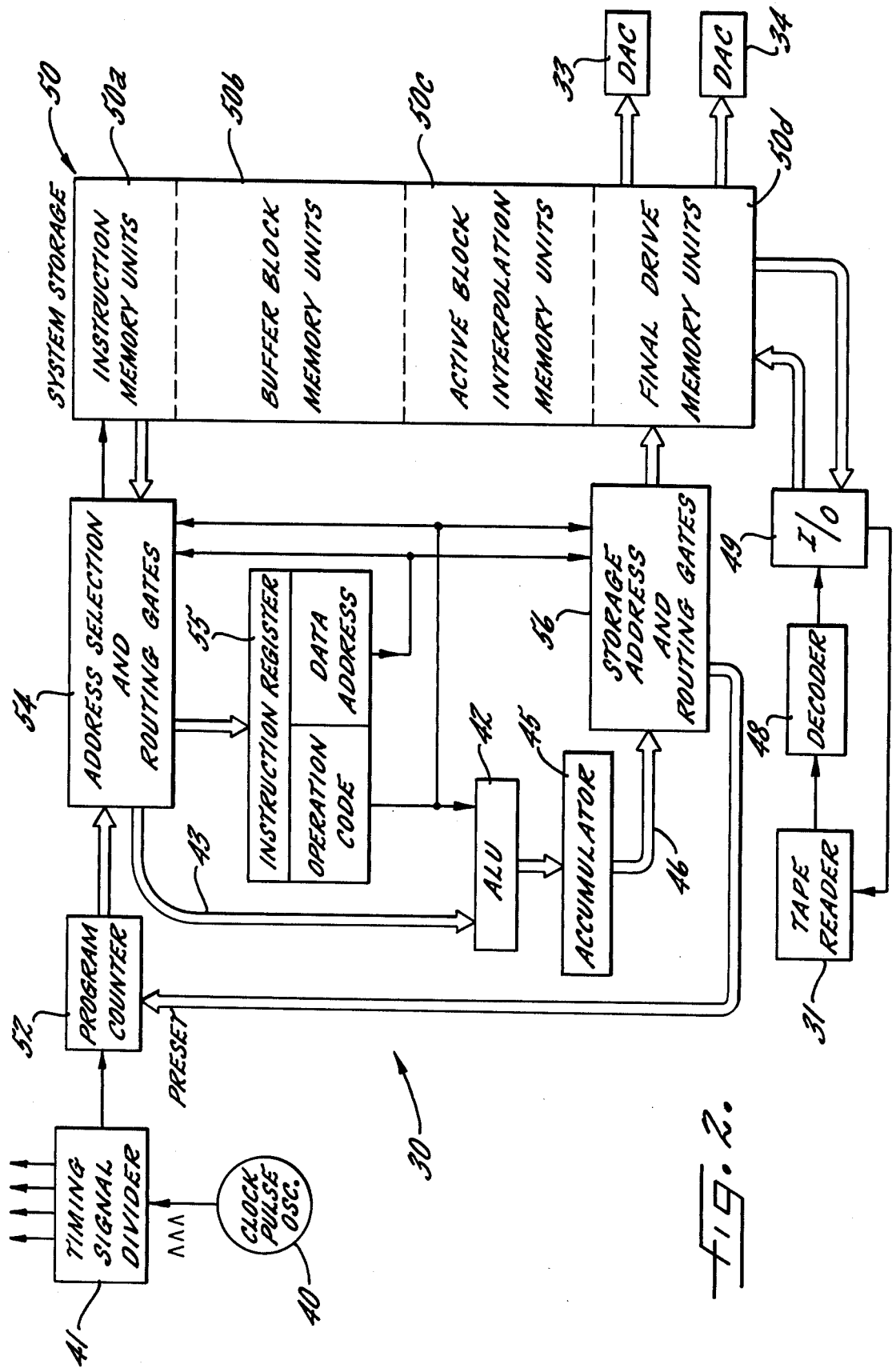
FIG. 2 is a diagrammatic block-and-line illustration of one suitable form of numerical control director with associated memory or storage, such director appearing more generally in FIG. 1.
Figure 3:
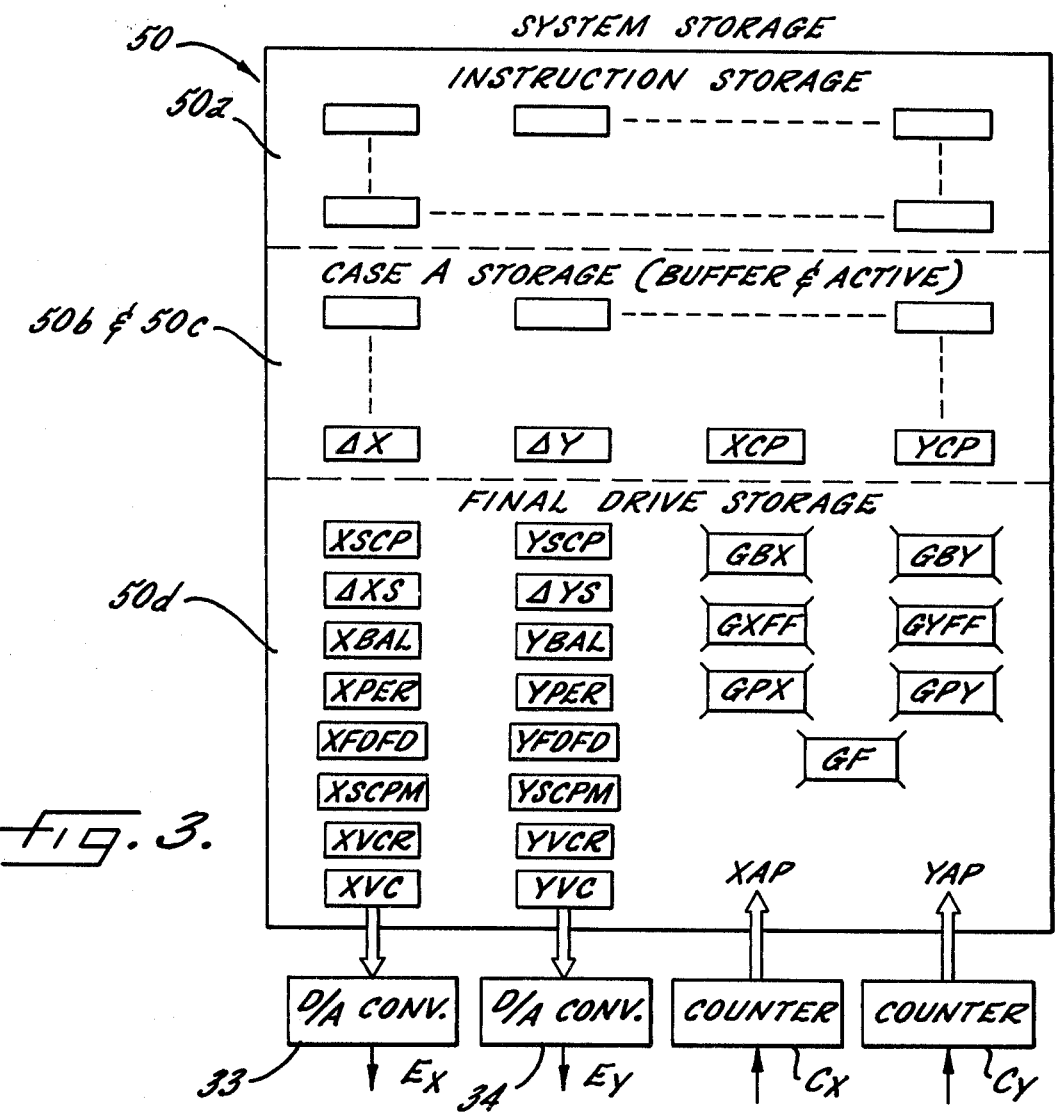
FIG. 3 is a block representation of the signal storing units or memory for the director of FIG. 6, showing in block form the storage units or locations for those signals necessary to an understanding of the preferred, exemplary embodiment of the invention.

With the foregoing in mind, the general internal organization of the numerical control director 30 may now be considered with reference to a specific example. Although the director 30 may be constructed as an analog computer using dc. voltages to indicate signal values (and sample-and-hold circuits for memory), or as a hard-wired iterative computer programmed by its wiring connections (as specifically described in Case A), the example of FIGS. 2 and 3 illustrates the director 30 as including a software-programmed digital minicomputer. The internal construction details of such computers are well known to those skilled in the art, and any of a wide variety of computers currently available in the United States market may be chosen.

By way of background, and as is well known, the computer includes a clock oscillator 40 which supplies pulses at a relatively high and constant frequency to a timing signal divider 41 which in turn sends timing signals to the other computer components so that elementary steps of fetching signals from memory, performing arithmetic operations, and storing the results are carried out in rapid sequence according to a stored master program of instructions. For this purpose the computer includes an arithmetic-logic unit (ALU) 42 served by an input trunk 43. An accumulator 45 receives the output from the ALU and transmits it over an output trunk 46. The output from the accumulator is sent back as an operand input to the ALU in certain arithmetic or comparing steps. These trunks are multiconductor wires which carry multi-bit signals representing in binary or BCD format numerical values of variables which change as a result of inputs from the tape reader 31 or computations performed by the ALU 42. The tape reader is coupled to the computer via a decoder 48 and an input/output interface 49.

The computer includes signal storage registers within a system storage or "memory" 50 which functionally is divided into sections containing instruction units, active block data units, buffer block data units, and final drive memory units —all as explained more fully below. In simple terms, when the computer finishes execution of one "block" of active data previously read in from the tape reader 31, it transforms and transfers the next succeeding block from the buffer to active data section, and causes the tape reader 31 to start up and read the following block into buffer storage where it will be ready for subsequent use. The memory registers in the instructions section are set by reading in and storage of a "master program" to contain multibit words of instruction which designate the operations to be performed in sequence, with logic branching and interrupts. The instruction memory contains the master program and sets up the gates and controls of the general purpose minicomputer to convert it into a special purpose digital control apparatus, the pertinent portion of that program being described hereinafter.

Since the organization and operation of the digital computer is well known, it will suffice to observe briefly that advancement of a program counter 52 to an address number will cause selecting gates 54 to read the addressed memory instruction onto the input trunk and into an instruction register 55. The operation code in the latter is decoded and sent to the ALU to designate the operation to be next performed (e.g., add, subtract, complement, compare, etc.). It is herein assumed for ease of discussion, that the ALU will algebraically add two operands unless instructed to subtract, multiply, divide, (SX, MX, DX), and so on. The data address in the instruction register is transferred to and conditions the address selecting gates 54 to fetch from memory the data word next to be used as an operand, the multi-bit signals being sent via the trunk 43 to the input of the ALU. At the conclusion of an arithmetic or logic sequence, the result or answer appears in the accumulator 45 and is routed via the trunk 46 through storage address gates 56 to an appropriate location or register in the system storage 50. The gates 56 are controlled by the data address output of the instruction register, so that an answer is sent for storage to the proper memory location, replacing any numeric signals previously there stored.

In a fashion familiar to those skilled in the art, the individual registers or memory locations may be designated by acronyms, and the quantity represented by the changeable number in any register may be designated by the same acronym. Each storage register or memory location thus constitutes a means for producing a given signal which can be changed in value by programmed computations or transfers effected by the ALU under control of the stored master program.

FIG. 3 is an expanded diagrammatic illustration of the computer memory, with the pertinent storage registers or locations having acronym labels to make clear how certain signals are created and utilized. The program instruction section 50a contains a very large number of instruction words which are formulated to cause orderly sequencing through the master program, with branching and interrupts. To avoid a mass of detail and yet fully explain the invention to those skilled in the art, the pertinent program instructions are not labeled in FIG. 3 but are set out in flow charts and listings to be described below. Insofar as the basic procedure for interpolation, to produce progressively changing position command signals XCP and YCP, is concerned the master program instructions may be, for example, essentially the same as those created by the timing gates of Case A and as set forth in Table I through V of Case A. It will thus be unnecessary to repeat here the detailed description which is already available and known from Case A.

The memory section 50b contains registers which hold the buffer block input signals. These buffer registers and the changeable signals held therein may, for example, correspond to the buffer registers and words described in Case A, particularly with reference to FIGS. 9k and 9l therein.

The memory section 50c contains those registers or locations holding signals constituting an active input block. Again, and as an example, the active block signals (as derived from the signals previously in buffer storage) may be those described in Case A, and the active storage registers may correspond to those described, particularly with reference to FIGS. 9f to 9j in Case A. The sequence of instructions for using and periodically changing the various signals produced by the several active storage registers may be the same as described in Case A.

Figure 4:
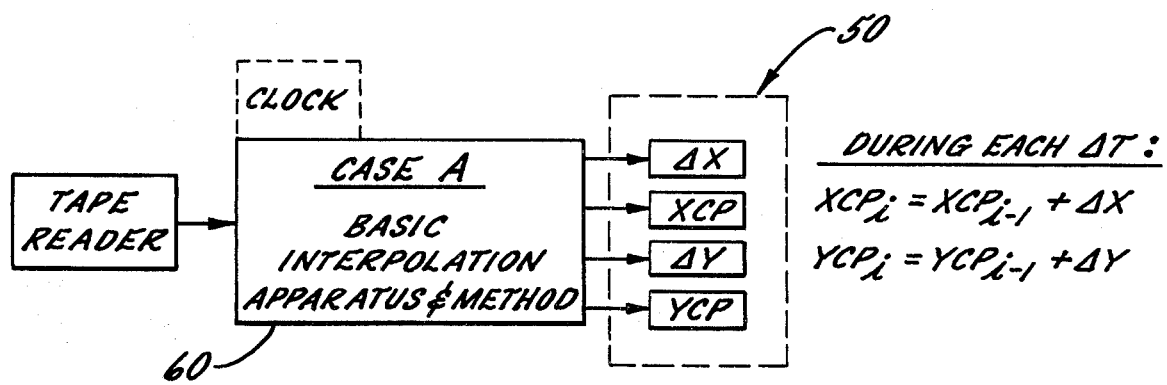
FIG. 4 is a fragmentary block diagram corresponding to a portion of Case A and indicates how certain signals produced in the disclosed system of Case A may be utilized in a final servo system incorporating the improvements of the present invention.

Indeed, cross reference has been made herein to Case A for disclosure of already known details of an exemplary director which incorporates apparatus and methods to produce basic signals XCP and YCP numerically representing primary commanded positions of the controlled member along the X and Y axes. The director as specifically disclosed in Case A (either FIGS. 9a–9l or FIGS. 40a–40m) may be physically employed to create and store in storage registers labeled "XCP" and "YCP" of present FIG. 3 the signals which are called primary position command signals XCP and YCP. This is illustrated in present FIG. 4, wherein the Case A interpolation apparatus is shown at 60 to create and feed signals to memory locations or registers in the storage 50 of present FIGS. 2 and 3. The signals so created, and periodically changed, are ΔX, XCP, ΔY, YCP.

The pertinent characteristics of any director, to which the improvements of the present invention may be applied, are:

a. Means are provided for measuring off successive, equal intervals ΔT in actual time. See the central timing system of FIG. 9b and Columns 19–24 in Case A by way of example.

b. Means are provided to produce position increment signals ΔX and ΔY during each period ΔT. These signals in magnitude and sign depend not only on the path feed rate designated by block input signals but also upon the angle of the path vector relative to the X axis. They represent the distances to be moved along the X and Y axes during each period ΔT, and thus they have dimensions of velocity, i.e., distance per unit time.

c. Means are provided to update or change the primary commanded position signals XCP and YCP during each period ΔT by the amounts represented by the signals ΔX and ΔY. See for example Table III in Case A. The operation may be expressed:

$$XCP_i = XCP_{i-1} + \Delta X \quad \text{(i)}$$
$$YCP_i = YCP_{i-1} + \Delta Y \quad \text{(ii)}$$

Certainly, the director specifically disclosed in Case A may —as one example—be used to create the primary command signals XCP and YCP which periodically change in the above-described fashion. But, of course, directors of equivalent nature and specifically different organizations may be chosen to produce such primary, periodically changing command signals XCP and/or YCP. If desired, the director 30 of FIGS. 2 and 3 may use the ALU 42 and master program instructions in memory section 50a to produce the signals XCP and YCP. It is important only to know that, in the embodiment of the present invention such signals are available—and they are here shown (FIG. 3) as produced by storage register locations labeled XCP and YCP. Of course, such signals may be fetched from storage and sent to the ALU input truck 43 (FIG. 2) by appropriate instructions, as is well known and as previously described.

In the practice of the present invention, the signals XCP and YCP are utilized to create the final signals ultimately utilized to control the X and Y axis servo drives—and in a manner which differs from and improves upon the servo energization described in Case A.

C. A First, Preferred Embodiment

In the preferred embodiment of the invention now to be described, the exemplary director 30 includes a storage section 50d which contains means for producing various signals which are utilized and changed periodically—to the end objective of energizing correctly the X and Y axis servo power elements, i.e., motors 21 and 23. Such means include memory or storage units here labeled with acronyms which identify not only the storage units but also the signals produced thereby. For ready reference, these may be defined:

XSCP: A secondary X position command signal, i.e., the "X servo commanded position".

YSCP: Same as XSCP, except for Y axis.

ΔXS: An auxiliary increment signal (differing from ΔX), i.e., the "ΔX servo" increment.

ΔYS: Same as ΔXS, except for Y axis.

XBAL: An "X servo balance" signal to remove unforeseen offset inaccuracies.

YBAL: Same as XBAL, except for Y axis.

XPER: The "X axis position error", i.e., the difference between the secondary position command and the actual position at any time.

YPER: Same as XPER, except for Y axis.

XFDFD: An "X axis feed forward" signal utilized in determining the final velocity command to the X motor.

YFDFD: Same as XFDFD, except for the Y axis.

XSCPM: A counterpart of XSCP but which is changed by smaller "micromove" amounts at more frequent intervals to form the actually used secondary position command.

YSCPM: Same as XSCPM, except for Y axis.

XVCR: The lower order digits, called the "X velocity command remainder" of a derived velocity signal.

YVCR: Same as XVCR, except for Y axis.

XVC: The "X velocity command" to the servo power means, i.e., a signal designating the X velocity at which the controlled member will be moved.

YVC: Same as XVC, except for Y axis.

GBX & GBY: Predetermined constant, but adjustable, signals representing "gain" factors to be used in the automatic X and Y servo balancing.

GXFF & GYFF: Preselected constant, but adjustable, signals representing gain factors to be used for feed forward action in the X and Y servos.

GPX & GPY: Preselected constant, but adjustable, signals representing gain factors to be applied to position errors in deriving the final X and Y velocity commands.

GF: A predetermined, but adjustable, signal representing a gain factor to be used in creating "filtering" action which moderates acceleration and deceleration along the X and Y axes.

The diagonal lines at the corners of certain rectangles shown in FIG. 3 are intended to indicate that the word stored and signaled in that register is a predetermined numerical constant. Of course, the stored number or constant is readily adjustable by reading into the register a different value via a manual data input keyboard or as a part of the master program.

In addition to the foregoing, FIG. 3 shows that the multi-bit actual position signals XAP and YAP are brought into the storage section 50d from the counters $C_x$ and $C_y$. This is simply an indication that the signaled outputs of the two counters are treated as if they came from storage units—and thus by appropriate instruction they can be "fetched" and sent to the ALU 42. Also, FIGS. 2 and 3 indicate that the velocity command signals from storage units XVC and YVC are continuously fed to the D/A converters 33 and 34 to produce the dc. voltages $E_x$ and $E_y$. As the numerical command signals XVC and YVC are updated or changed on a rapidly iterated schedule, the voltages $E_x$ and $E_y$ correspondingly vary with time.

In carrying out the improvements of the present invention, and with the foregoing introduction in mind, the director 30 and the digital computer therein are conditioned by a master program to constitute a plurality of means for performing certain functions and to carry out the method steps which are involved. The computer is not the only apparatus involved, however, since the means for producing actual position feedback signals XAP, YAP are outside the computer, as are the D/A converters 33, 34 and the motors 21, 23 as well as the ultimately controlled member 14. With this in mind, a detailed understanding of the preferred embodiment of the invention may best be gained from a narrative sequence of the operations which repeatedly recur, the pertinent sub-routines of the master program thereby being explained in detail with reference to the sub-routine flow charts in FIGS. 5 and 6 taken with more detailed program listings in Tables I and II. The latter tables are located for convenient reference at the end of this specification. The flow charts and listings will show fully how the computer is "set up" to embody the present invention.

It may be assumed, according to the example given in Case A, that the successive time periods ΔT measured off by the clock 40 and the timing signal generator 41 (or by the time sweep circuit shown in Case A) are each 20 ms. in duration. Within each such period, sub-periods are marked off by timing pulses so that a sub-routine may be executed every tenth of a ΔT, i.e., every 2 ms.

Finally, computational step pulses appear every 20 microseconds—so that one hundred fetch, compute or store steps may be executed during each 2 ms. interval. These particular time period choices are exemplary only; they can be chosen to have other specific values. As indicated in Case A the periods ΔT are subdivided into sub-periods ΔT/N where N is any conveniently chosen integer.

Figure 5:
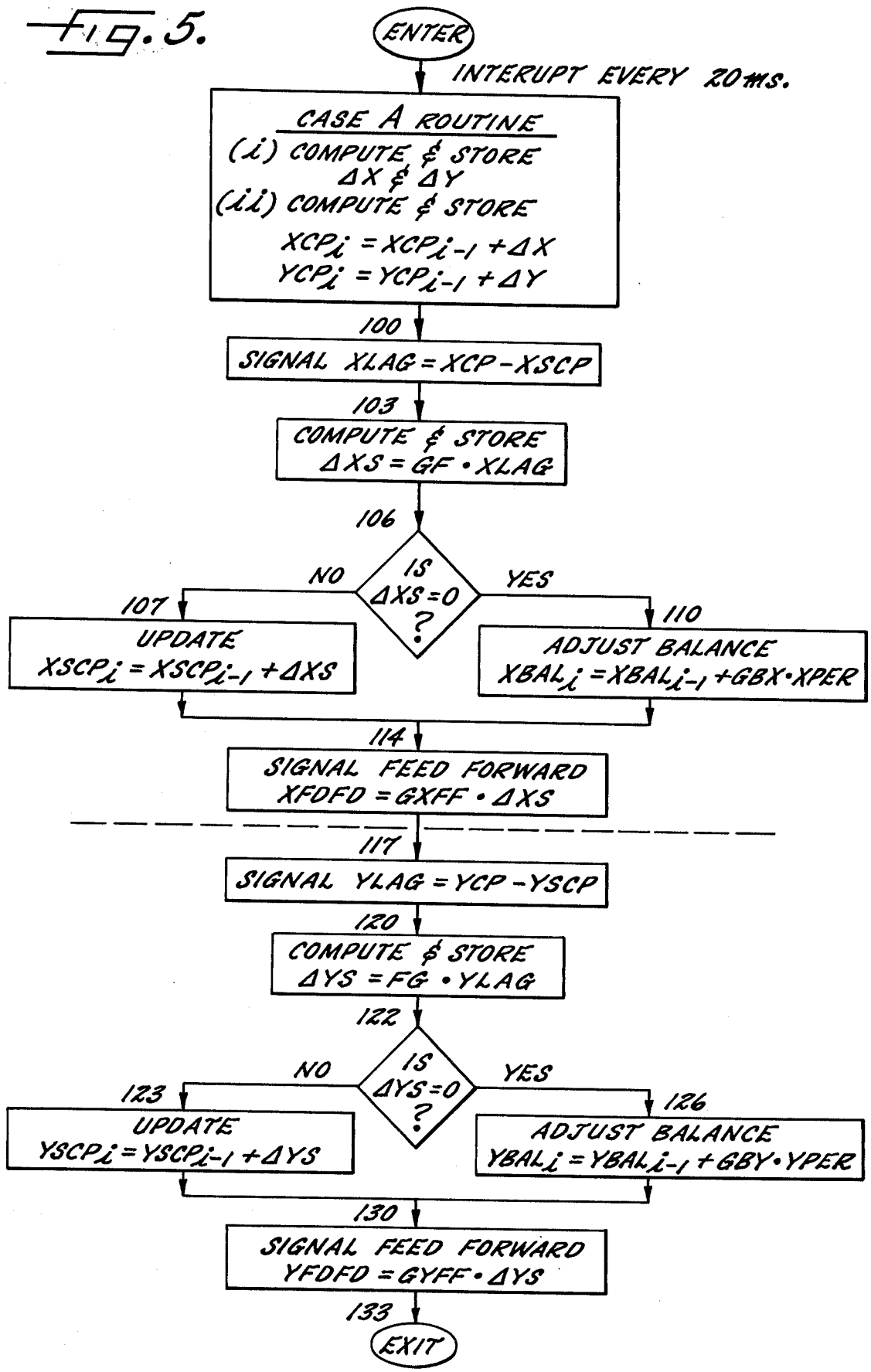
FIGS. 5 and 6 are two flow charts which respectively illustrate sub-routines within a master program which is fed to and conditions the digital computer forming a part of the director of FIG. 1 —to create a first embodiment of the present invention.

As indicated above, the signals XCP and YCP are changed by the amounts ΔX and ΔY during each period ΔT. Referring to FIG. 5 and Table I, the program steps there shown are carried out once during each period ΔT, e.g., once every 20 ms. by an interrupt signal coming shortly after such changes. The first step is thus arbitrarily designated 100, following steps $a, b_1 \ldots b_n$ which are carried out according to Case A to update XCP and YCP by the signaled amounts ΔX and ΔY.

In keeping with the invention, and considering first the X axis, provision is made to compute an auxiliary increment signal which by its value is proportional to the difference between the primary command signals XCP and a secondary position command signal XSCP. At steps 100 to 106 (FIG. 5) the auxiliary servo increment signal ΔXS during each period ΔT is derived according to the relations:

$$XLAG = XCP - XSCP \quad (1)$$
$$\Delta XS = GF \cdot XLAG = GF (XCP - XSCP) \quad (2)$$

The symbol XLAG designates the "lag" between the secondary and primary position commands; and the symbol GF is a proportionality or gain factor having some chosen value less than 1.0. From Table I, it will be seen that on instruction step 100 the accumulator is first cleared (or reset to zero) after which the signal XCP is brought in, added to zero, and the result sent to the accumulator. On instruction step 101, the signal XSCP is brought in from storage with a subtract instruction "SX" to the ALU; whereupon the answer in the accumulator becomes XCP − XSCP = XLAG. On step 102, that answer is written into a storage location (not shown in FIG. 3) merely so that it may, if desired, be later sent to a visual display. As step 103 begins, XLAG remains in the accumulator, the gain signal GF is brought to the ALU with a multiply instruction "MX", and the product GF·XLAG = ΔXS is signaled on the accumulator output lines. (Note: The multiplication procedure may consume more than one 20 μ sec. interval, but it is executed as a single instruction.) Then, on step 105, those accumulator output signals are written as the new value of ΔXS into the ΔXS storage.

For a purpose to be described, automatic balancing of each servo to compensate for spurious drift or offset is carried out at any time when commanded X axis motion is not in progress. It will become apparent that the X motion theoretically ceases (i.e., is not called for) when the auxiliary increment term ΔXS is zero. Thus, at step 106 (when ΔXS remains on the accumulator output) a "comparison" instruction results in comparison of ΔXS with zero; if they are not equal, the program counter proceeds to step 107; if they are equal (ΔXS = 0), then the program counter, via the routing gates 56, is preset to jump to step 110.

In the former case, at step 107 the signals XSCP are read additively into the ALU, so that the sum XSCP + ΔX is obtained. This is written or stored back into the XSCP memory location as a new or updated value by the "write" instruction of step 108. In other words, during each period ΔT, the secondary position command XSCP is changed by the amounts of the then-signaled auxiliary increment ΔXS, such that:

$$XSCP_i = XSCP_{i-1} + \Delta X \tag{3}$$

After step 108, the system jumps from step 109 to step 114.

In the other case (when ΔXS = 0), the value of XSCP would not in any event change. But the balance signal XBAL is incrementally changed if a position error then exists—as indicated by steps 110–113. First on step 110 (Table I), the gain factor signal GBX is brought into the cleared accumulator. A multiply instruction "MX" on step 111 with fetching of the then-existing position error signal XPER (produced as explained below) results in the product GBX·XPER appearing as an answer. On step 112, the signal XBAL is brought in additively so that the sum XBAL + GBX·XPER is obtained. Then on step 113, that sum is written back into the XBAL storage location as a new and updated value. Thus, during each period ΔT when ΔXS is zero, the steps 110–113 are executed to change XBAL by an amount proportional to the then-existing position error, viz:

$$XBAL_i = XBAL_{i-1} + GBX \cdot XPER \tag{4}$$

Next a feed forward signal is established, i.e., correctly and freshly determined, during each period ΔT. Feed forward is a technique heretofore known in the art (see Simon et al U.S. Pat. No. 3,798,430); it injects a component in the servomotor excitation voltage which is proportional to the desired velocity so as to reduce the position following error. Recalling that the auxiliary signal ΔXS has dimensions of distance per ΔT, such signal is a measure of the theoretically commanded velocity, i.e., the rate of change of the finally commanded position XSCP. Thus, to produce a proportional signal for forward feed, the present system acts to carry out during each ΔT:

$$XFDFD = GXFF \cdot \Delta XS \tag{5}$$

As shown in Table I, the gain factor GXFF is brought into the cleared accumulator on step 114. The stored signal ΔXS is fetched along with a multiply instruction MX on step 115, and the resulting product XFDFD is written into the corresponding storage register on step 116.

Thereafter, program steps 117–132 are carried out. Because these involve substantially identical procedures of steps 110–116 but with respect to corresponding signals for the Y axis (YCP, YSCP, YLAG, ΔYS, YSCP, YBAL, GBY, YPER, GYFF and YFDFD), they will not be redundantly described. The reader may readily follow FIG. 5 and Table I to see how the signals pertaining to the Y axis servo are iteratively changed. It may be noted, incidentally, that the same gain factor signals GF is employed to determine both ΔXS and ΔYS. This keeps X and Y axis motions reasonably coordinated as XSCP and YSCP change at rates which differ from the rates of change of the primary command signals XCP and YCP.

At step 133 in FIG. 5 and Table I the programmed sub-routine (carried out during each ΔT) is complete, and the computer may exit for return to a main program until the next interrupt appears. The signals XSCP, YSCP, XFDFD, YFDFD, XBAL, YBAL are accurate and ready for use during the next intervening 20 milliseconds.

After the sub-routine of FIG. 5 has been completed, it is preferred (as an optional but non-essential procedure) that the finally commanded X and Y axis positions be more frequently updated by small "micromoves". The micromove procedure is per se described in Case A. It involves in simple terms commanding X and Y axis motions of ΔXS/N and ΔYS/N during each of successive shorter intervals ΔT/N, but the natural result of this is that the effective position command is the secondary signal XSCP changed by the amount ΔXS per ΔT. In the present example, it is assumed that the integer N is chosen to have a value of 10.

To carry out the micromoving sub-routine, interrupts are created by program counter each ΔT/N seconds, e.g., each 2 ms. A programmed sub-routine illustrated by the flow chart of FIG. 6 and listed in Table II is entered in response to each such interrupt at 2 ms. intervals.

After entry on sub-routine step 01, the first two principal operations for the X axis are to:
a. utilize the auxiliary increment signal ΔXS to change the final servo position command XSCPM by 1/N times the value of the increment amount (and so that XSCPM will change by ΔXS and equal XSCP after the sub-routine is executed N times); and
b. utilize the freshly determined commanded position XSCPM to determine the then-existing position error. The micromove updating of XSCP iteratively accomplished:

$$XSCPM_i = XSCPM_{i-1} + (\Delta XS/10) \text{ every 2 ms.} \tag{6}$$

The position error is freshly signaled according to the relation:

$$XPER_i = XSCPM_i - XAP \text{ every 2 ms.} \tag{7}$$

where XAP is the actual position signaled by counter $C_x$.

In more detail, on step 02 the accumulator is cleared, the signal ΔXS is called in, and the accumulator contents are shifted one decimal place to the right. The signaled answer is thus ΔXS/10 = 0.1 ΔXS. On step 03, the signal XSCPM is read in additively and on step 04 the new sum $XSCPM_{i-1}$ + ΔXS/10 is written back as the new value $XSCPM_i$ into the XSCPM storage. The value $XSCPM_i$ remains in the accumulator.

Then on step 05, the signal XAP is fetched from the $C_x$ counter output terminals with a subtraction instruction. The difference XSCPM − XAP appears as the answer in the accumulator representing the error XPER between the instantly commanded position XSCPM and the actual position XAP. On step 06, this error value XPER is written into its storage location.

In the subsequent steps 07 to 12, the final value of an X velocity command is derived and signaled. Letting XVC represent numerically the velocity at which the motor 21 must run at the present time, it is made up according to the expression:

$$XVC = GPX \cdot XPER + XFDFD + XBAL + XVCR \tag{8}$$

where GPX is simply a predetermined, but adjustable position loop gain factor, and where XVCR is the remainder left over from the previous determination of the velocity number XVC. That is, if on the previous iteration the number $XVC_{i-1}$ as signaled in the accumulator was a seven decimal place number xx.xxxxx, but only the five higher order digits xx.xxx were stored at storage location XVC, the "remainder" constituted by the lower order digits .000xx is stored in the register XVCR. Then when the new commanded velocity value XVC$_i$ is computed according to Equation (8), the previous remainder XVCR is added to the other three terms—so as to keep the new seven place answer accurate. In situations where the D/A converters can only accept, say, five decimal place digital input signals but the commanded velocity is computed to greater accuracy, this procedure prevents small cyclical inaccuracies in the running changes of desired velocity signals.

In detail as shown by Table II, the foregoing is accomplished by reading into the ALU on step 07 the gain factor signal GPX with a multiply instruction. Recalling that XPER resided in the accumulator at the end of step 06, the product GPX·XPER shows up as the answer in the accumulator. On steps 08, 09, 10 the signals XFDFD, XBAL and XVCR are read in additively so that after step 10 the accumulator holds:

$$XVC = GPX \cdot XPER + XFDFD + XBAL + XVCR \qquad (8)$$

which is accurate to say $n$ decimal places. On step 11, the $m$ lower order digits (say, .000xx) of this signaled answer are written for storage at XVCR—to be used during the next iteration. The $(n - m)$ higher order digits (say, xx.xxx) are written for storage at XVC on step 12—where they are transmitted to the D/A converter 33.

Thus, by steps 01–12 shown in Table II the apparatus of FIGS. 2 and 3 produces a final digital output signal XVC which is rapidly changed (in this instance every 2 ms.) so as to remain an accurate designation of the X axis velocity needed to keep the member 14 tracking the finally commanded position XSCPM with a very small following error. The signal XVC is converted into a dc. voltage E$_x$ forming the input to the final amplifier 35 (FIG. 1) which creates the voltage MV$_x$ to make the motor 21 run at a corresponding speed and direction.

Figure 6:
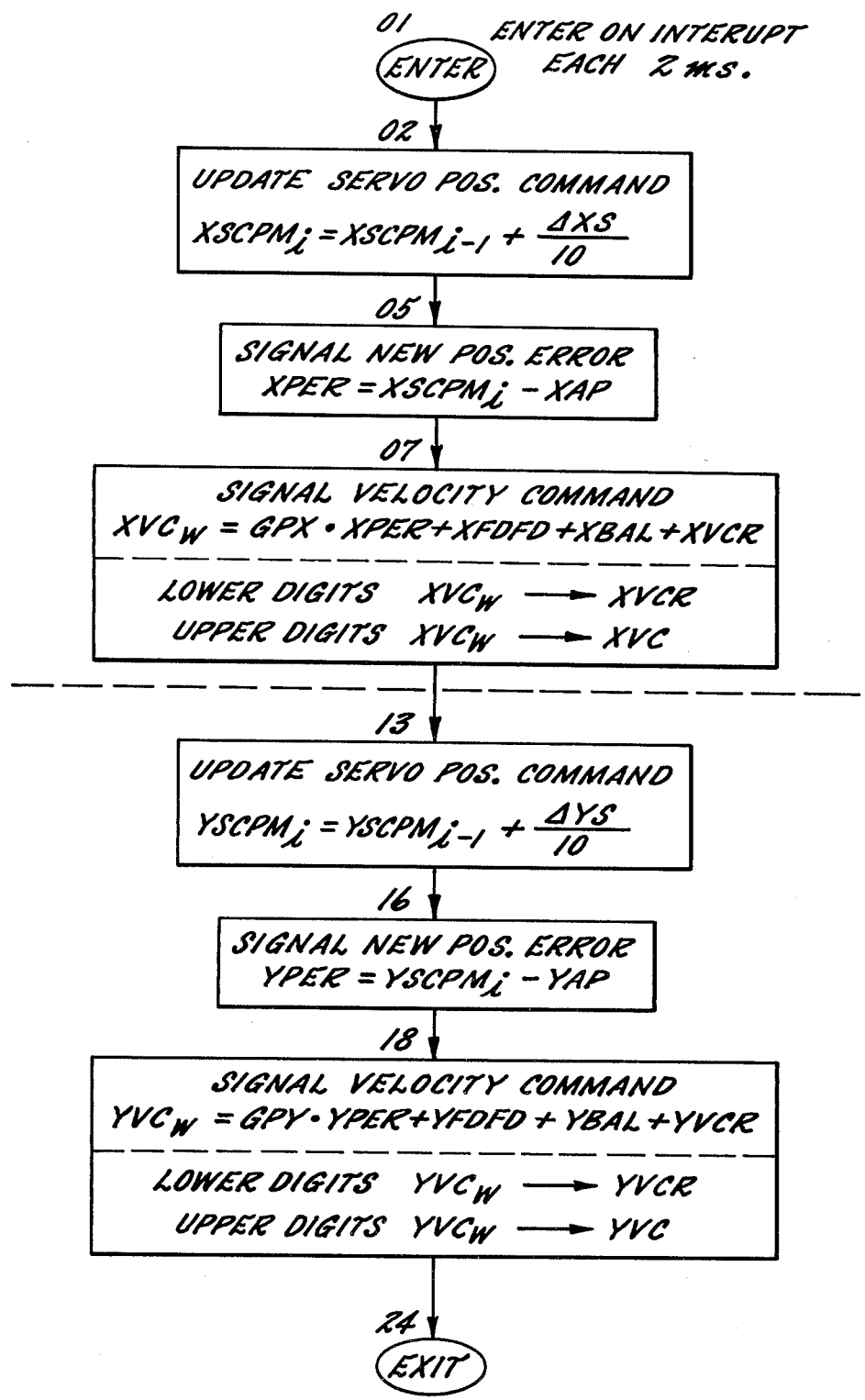
Figure 9B:
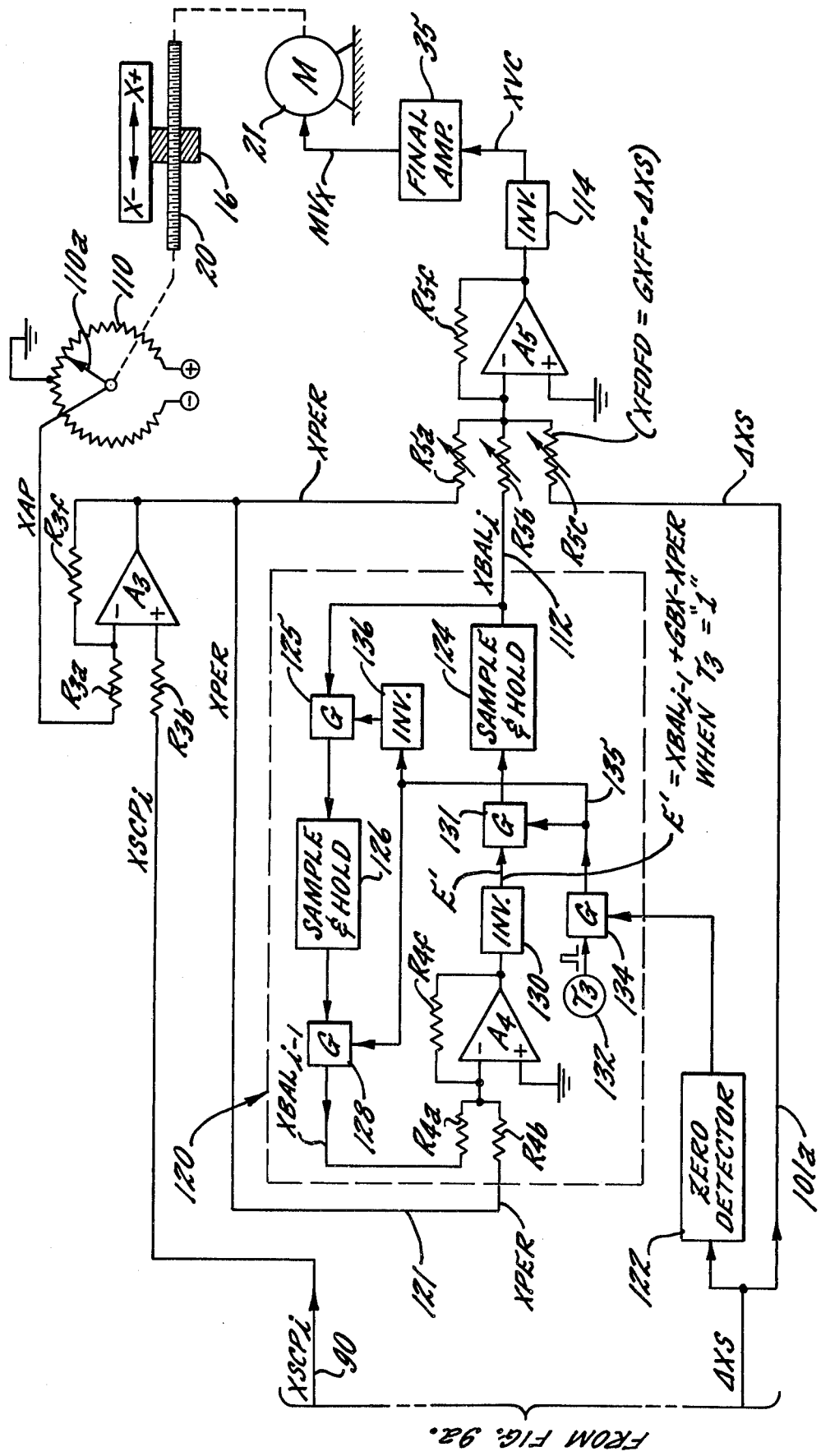

The steps 13 to 23 shown in FIG. 6 and Table II correspond to the steps 01 and 12 already described, except they deal with the signals (ΔYS, YSPM, YAP, YPER, GPY, YFDFD, YBAL, YVC and YVCR) pertaining to the identical Y axis servo. Of course, at step 24 the system exits from the sub-routine to return when the next one of the 2 ms. interrupts occurs.

Noteworthy is the fact that after N iterations through the short sub-routine of FIG. 6 and Table II, the last updated values of the position error signals XPER and YPER are available to be used on the next pass through the sub-routine of FIG. 5 and Table I. Also, the value of the final servo position command signal XSCPM (which is changed by micromove updating) is now equal to the last-computed value of the secondary position signal XSCP. In other words, the "micro adjusted" signal XSCPM at the end of every period ΔT is equal to the then signaled value of XSCP and therefore the signal XSCPM may be viewed as changed by the amount ΔXS during each period ΔT. This points to the fact that if the iteration periods ΔT are chosen to be short enough, then the micromove command XSCPM may be dispensed with, the D/A converter 33 fed from the XSCP register, and the other steps of FIG. 6 and Table II may be carried out once per ΔT as a part of the FIG. 5 sub-routine.

It is appropriate to review the significance of the iterative operations which have been described. For brevity only the X axis will be considered since the Y axis servo apparatus and operation are the same. First, the basic system (as disclosed in Case A) constitutes a means for producing a primary position command signal XCP which is updated by a signaled amount ΔX once during each of successive time periods ΔT. The magnitude of the ΔX signal represents desired velocity; it may change abruptly by a wide margin from instant to instant (either because the path feed rate for a new input block of signals is different from the preceding, or because the path segment vector of a new block differs in angle from that of the previous block). If the axis velocity were 10 inches per minute and there were an attempt suddenly to change it to 100 inches per minute, the motor 21 would have insufficient power or torque to execute such a change; the X axis motion might fail to keep the ratio to the Y axis motion necessary to maintain the controlled member on the desired path vector. This problem is more fully explained in Case B where the described solution involves rather complicated operations to allow the primary increment (velocity) signal ΔX to change only gradually.

In the present case, however, ΔX may change widely and abruptly. But loss of control due to attempts at impossibly great acceleration or deceleration is prevented—and by the rather simple apparatus and methods to create and utilize an auxiliary increment signal ΔXS and a secondary position command signal XSCP.

Observe first that (if microwave updating is ignored) the signal XSCP is the one from which the position error XPER is determined (Equation 7 with XSCP substituted for XSCPM) each period ΔT. It is that error and the term GPX·XPER in Equation (8) which predominantly determines the signal XVC with which the motor 21 is finally "commanded" to drive the controlled member. Yet, even when the primary increment signal ΔX changes abruptly, and the primary position command XCP abruptly varies in its rate of change, there is a "filtering action" which prevents the secondary position command XSCP from having an abrupt, large transition in its rate of change. This is so because means are here responsive to the primary and secondary position command signals XCP and XSCP for producing the auxiliary increment signal ΔXS in a fashion which prevents it from changing in magnitude at a rate which is as high as the rate of change of the primary velocity increment signal ΔX.

Consider in FIG. 7 the dashed line curve 70 which represents typical large and abrupt changes in the velocity increment signal ΔX. For any of a variety of reasons, the value of that signal changes from zero to ΔX$_1$ at time instant $t_0$, then changes from ΔX$_1$ to ΔX$_2$ at instant $t_{10}$, then drops from ΔX$_2$ to ΔX$_3$ at instant $t_{16}$, and then jumps to zero at instant $t_{24}$. Each of these changes involves a large acceleration or deceleration if the motor 21 were expected to keep the X axis velocity at corresponding values. But in the operation of the system described above, and recalling that the gain factor GF in Equation (2) is less than 1, whenever the velocity signal ΔX changes abruptly, the "lag" represented by XLAG will take on some finite value because the rate of change of XCP will differ from the rate of change of the secondary signal XSCP. That is, assuming that at instant $t_0$ both ΔX and ΔXS are zero, and XCP and XSCP are equal and unchanging, then when ΔX changes from zero to ΔX$_1$, the lag XCP − XSCP is finite but ΔXS =

GF (XCP − XSCP) is less than $\Delta X_1$. As each time period $\Delta T$ passes, the auxiliary increment $\Delta XS$ increases—but by an amount which is progressively smaller as the lag becomes larger. Therefore, the value of the auxiliary velocity signal $\Delta XS$ rises progressively in successive steps (which are here for convenience indicated by curve 71 in FIG. 7) until it asymptotically merges into substantial agreement with the value $\Delta X_1$. In the latter state of affairs, XSCP changes at the same rate as XCP, the lag remains constant and, as shown, $\Delta XS$ is equal to $\Delta X_1$.

The same "smooth" or gradual rise (which is in a small step during each $\Delta T$) of the signal $\Delta XS$ occurs after instant $t_{10}$; when the signal $\Delta X$ jumps from $\Delta X_1$ to $\Delta X_2$, the signal $\Delta XS$ first makes a smaller jump to V', then an even smaller jump to V", and then a still smaller jump to V'''—so that the velocity represented thereby rises slowly enough that the motor 21 can correspondingly accelerate the controlled member 14. Of course, when $\Delta X$ suddenly drops at instant $t_{16}$, the signal $\Delta XS$ falls in smaller progressive steps as indicated by curve 71; the same action begins at instant 24 when $\Delta XS$ begins to fall step-wise but smoothly to zero.

Referring to FIG. 8, the primary and secondary position command signals XCP and XSCP are there shown as curves 74 and 75 plotted against time—as they will vary when the signal $\Delta X$ changes in the fashion shown by FIG. 7. The signal XCP changes linearly with time when $\Delta X$ has a first value $\Delta X_1$. That is, XCP changes by $\Delta X_1$ per $\Delta T$ (see curve portion 74a). As this begins, the secondary position command signal XSCP varies non-linearly at curve portion 75a because $\Delta XS$ is initially less than $\Delta X_1$ but gradually increases toward equality with $\Delta X_1$. As curve portion 75b is reached, $\Delta XS$ is essentially equal to $\Delta X_1$, and XSCP increases with the same slope as XCP.

Beginning at instant $t_{10}$, XCP is increasing at a uniform rate (shown as a slope at 74b) of $\Delta X_2$ per $\Delta T$, but just after instant $t_{10}$ the signal XSCP rises more gradually along a non-linear curve portion 75c. This merges into the curve portion 75d where the lag (XCP − XSCP) becomes essentially constant and $\Delta XS$ becomes constant at a value essentially equal to $\Delta X_2$. At instant $t_{16}$, $\Delta X$ changes to a lower value $\Delta X_3$, and $\Delta XS$ is progressively reduced during successive $\Delta T$ periods so that in effect it non-linearly changes (curve portion 75e) to a lesser constant slope (curve portion 75f). After instant $t_{24}$ when $\Delta X$ changes to zero, $\Delta XS$ is progressively reduced and reaches zero at a slightly later time.

In summary, the present invention "isolates" the primary position command signal XCP from the secondary position command signal XSCP used actually (by way of the micromove updated signal XSCPM) to control the X axis servo. It causes the secondary signal to vary more gradually and smoothly because the auxiliary increment $\Delta XS$ used for updating the secondary signal can only have values which are a fraction of the difference (XCP − XSCP) and thus which change more gradually than $\Delta X$ when the latter for any reason changes. This improvement is accomplished by the above-described means responsive, during each period $\Delta T$, to the primary and secondary command signals XCP and XSCP for producing an auxiliary increment signal $\Delta XS$ which is proportional (by a fractional gain factor GF) to the difference (XCP − XSCP) between such signals; means for changing the secondary signal XSCP during each period $\Delta T$ by the amount of the auxiliary increment signal $\Delta XS$; and means responsive to the secondary signal XSCP for moving the controlled member to keep the latter's actual position XAP substantially in agreement with the secondary position command value.

In the preferred embodiment, a final velocity command signal XVC is created according to the difference (XSCPM − XAP) between the commanded and actual positions, and indeed the secondary position command XSCP is converted into a corresponding signal XSCPM which is updated more frequently by $\Delta XS/N$ at intervals of $\Delta T/N$. These added refinements are desirable, but may be omitted in many applications of the invention.

The operation set out above with respect to the X axis servo is applicable to the Y axis servo also.

A second important aspect of the control system resides in the advantages flowing from the creation and use of the XBAL and YBAL signals. Suppose the controlled member 14 were at rest in the commanded position (and thus that $\Delta X = \Delta XS = 0$ and XCP = XSCP = XSCPM = XAP with XPER = 0). If now any final circuit component, e.g., the D/A converter 33 or the final amplifier 35 had a spurious change of its operating characteristics (due to temperature changes or aging, for example) then the dc. voltage $E_x$ or the motor excitation voltages $MV_x$ might take on some finite value—even though under the assumed conditions they are supposed to be zero. If $MV_x$ spuriously drifts from zero to some finite offset value, then the motor 21 will be energized, the controlled member will move and the actual position signal XAP will change—by an amount and in a direction to restore the motor voltage $MV_x$ back to zero. In other words, the servo will "balance" in the face of a spurious final amplifier offset and bring the member 14 to rest at a position which disagrees with the command position signal XSCPM—and which makes the error term PGX·XPER = PGX (XSCPM − XAP) have a finite value, so that XVC has a finite value, to cancel out final amplifier offset.

In keeping with the present invention, however, such spurious offsets which may arise in the final circuit components are removed, and the servo is automatically balanced with the controlled member brought precisely to the commanded position. As noted above, there are provided means for producing a special signal XBAL which is algebraically combined with the error term GPX·XPER to create the final velocity designating signal XVC. Viewed in a simple and broad way (and ignoring for the moment the XFDFD and XVCR terms), Equation (8) may be written in simplified form:

$$\text{XVC} = \text{GPX·XPER} + \text{XBAL} - \text{OFF} = \text{GPX(XSCP} - \text{XAP)} + \text{XBAL} - \text{OFF} \tag{8a}$$

where "OFF" represents symbolically an offset in the final amplifier. Normally, if XSCP is unchanging and absent any spurious drift offset (when OFF = 0), the term XBAL will and should be zero; thus when the position error XPER is zero, then XVC will be zero to hold the motor 21 at rest.

But the invention here described includes means for progressively changing the value of XBAL by the amount GBX·XPER each period $\Delta T$ whenever and if there is no commanded position change ($\Delta XS = 0$) and XPER is not zero. This is accomplished by the progressive updating:

$$\text{XBAL}_i = \text{XBAL}_{i-1} + \text{GBX·XPER} \tag{4}$$

shown at steps 110–113 (FIG. 5 and Table I) which can only take place during each period ΔT if the increment number ΔXS is zero.

Now, if when ΔXS is zero but the error XPER is not zero, then during each period ΔT, the XBAL term in Equation (8) is changed by a predetermined fraction of the error,—the gain factor GBX preferably being less than 1.0. Therefore, if the phantom term OFF is, say, −2.0 when the XBAL term is zero, the motor will be at rest only when Equation (8a) has the specific values:

$$XVC = 0 = \underset{GPX \cdot XPER}{+2} + \underset{XBAL}{0} - \underset{OFF}{2} \tag{8b}$$

But since XPER is finite, XBAL will progressively increase by incrementing thereof during each period ΔT so that Equation (8b) will progressively change to:

$$XVC = +1 = \underset{GPX \cdot XPER}{2} + \underset{XBAL}{1} - \underset{OFF}{2} \tag{8c}$$

The finite signal XVC will make the motor voltage $MV_x$ finite, the member 14 will move, and the error will decrease until Equation (8c) ultimately changes to the balanced condition:

$$XVC = 0 = \underset{GPX \cdot XPER}{0} + \underset{XBAL}{2} - \underset{OFF}{2} \tag{8d}$$

In this way, any position error which tends to arise because of drift or aging is removed. The XBAL signal increases or decreases as necessary (but gradually over a span of time) to cancel out any offset in the servo equipment. Because a position error XPER will exist when the control element is being affirmatively moved (due to changes in XSCP and XSCPM), the XBAL term is not then adjusted and it remains at its last-established value. This has the great advantage however, that during dynamic motion of the controlled member, the XBAL term continues to cancel any offset, so that the following error does not include the offset and coordination of X and Y axis motions is more precise.

D. An Alternative, Second Embodiment

Although it is preferred and more practical to practice the methods and apparatus of the invention by utilizing a programmed digital computer, it is in no way essential that a digital computer, or a software program therefor, be employed to carry out the present invention and achieve its advantages. To make this clear, FIG. 9 is a schematic diagram of a second embodiment, using analog devices and signals, which is the full equivalent of the digital embodiment described with reference to FIGS. 2–7. Those skilled in the art will recognized from the following description that the system of FIG. 9 straightforwardly incorporates the concepts and the means described above, but by analog devices which function in substantially the same way to produce substantially the same results.

In FIG. 9, the basic system of Case A, represented at 80, is employed to produce in XCP and YCP registers the signal XCP abd YCP which are changed by amounts ΔX and ΔY during each of successive periods ΔT. A synchronizing signal from the time sweep generator of Case A is applied to a pulse oscillator 81 which supplies pulses at frequency of 500 Hz. to a scale of ten counter 82. The counter is connected to a decoder 84 which produces on its ten output lines staggered pulse trains each having a frequency of 50 Hz. The successive pulses in each train mark off intervals of 0.020 seconds (i.e., ΔT). It is assumed merely for purposes of the explanation to follow, that the XCP and YCP registers in the Case A director 80 are updated at those instants when pulses appear on counter terminals $T_o$ and $T_1$.

The output from the XCO register is passed through a D/A converter 85 to form a dc. voltage labeled XCP on conductor 86. All of the subsequent signals mentioned in connection with FIG. 9 are variable dc. voltages, but they will be designated by the same symbols employed above to identify various corresponding digital signals in the first embodiment.

In FIG. 9, the primary position command dc. voltage XCP will change during each period ΔT (and at instant $T_o$) so that it varies stepwise by a changeable increment ΔX. With that as a starting point, the apparatus of FIG. 9 includes means to create a secondary position command signal XSCP, together with means for changing the latter by an auxiliary increment ΔXS which is a function of the difference between the primary and a secondary position command signal. In particular, the periodically incremented secondary position command voltage $XSCP_i$ is signaled on a conductor 90 at the output of a "sample-and-hold" (hereafter "SH") circuit 91. Such sample-and-hold circuits are familar to those skilled in the art; they function to maintain at their output a dc. voltage equal to that previously applied to their input even when the input signal subsequently is disconnected. The output voltage from SH 91 is normally fed back via a normally open signal transmission gate 92 to the input of a second SH circuit 94 so that the output of the latter on line 95 is normally the same as the signal $XSCP_i$. The gate 92 is held normally enabled by an inverter 96, and it is disabled by the $T_2$ timing pulse applied from the decoder 84 to a terminal 98.

The SH circuits 91 and 94 form a part of an accumulator 100 which functions to add an incoming signal to the signal previously stored and to thereafter signal as a new output the sum thus obtained. In the present instance, the input to the accumulator 100 appears on a conductor 101 which is the output of an algebraic summing operational amplifier $A_1$. That input signal on conductor 101, here labeled ΔXS, is routed via an input resistor $R_{2b}$ to the inverting input of a summing operational amplifier $A_2$ having a feedback resistor $R_{2f}$. A second input to that amplifier $A_2$ comes from the output of a normally disabled gate 102 via an input resistor $R_{2a}$, such gate being enabled only by and at the instants of the timing pulses $T_2$ applied to terminal 98. Thus, during the short timing pulses T2, the gate 92 is disabled to isolate the input of the SH circuit 94 and to connect the output of the latter via the resistor $R_{2a}$ to the inverting input of summing amplifier $A_2$. To reverse the signal inversion which occurs in amplifier $A_2$, its output is fed through an inverter 104 whose output is passed through a normally disabled gate 105 to the input of SH circuit 91 during the instants T2 when the gate 105 is enabled.

The amplifier $A_1$ serves to create a dc. voltage representing the auxiliary increment signal $\Delta XS$ which is proportional to the difference between the primary command signal XCP and the secondary command signal XSCP. For this purpose, the signal XCP on conductor 86 is sent through an input resistor $R_{1b}$ to the non-inverting input of amplifier A1. As a second input, the voltage on conductor 95 is routed through an input resistor $R_{1a}$ to the inverting input of the amplifier $A_1$. With a negative feedback resistor $R_{1f}$ the amplifier $A_1$ functions as a subtractor which imposes a predetermined gain on the difference between its two input signals. More specifically, the resistors are chosen such that:

$$\frac{R_{1f}}{R_{1a}} = \frac{R_{1f}}{R_{1b}} = GF \tag{9}$$

where GF is the gain factor mentioned above and preselected to have some value less than 1.0.

Those skilled in the art will be familiar with the operation of operational amplifiers and they will recognize immediately that with input voltage signals here labeled XCP and $XSCP_{i-1}$, the output $\Delta XS$ from amplifier $A_1$ will vary according to the relation:

$$\Delta XS = GF (XCP - XSCP_{i-1}) \tag{2'}$$

Recalling from the discussion of the first embodiment that the difference (XSCP − XCP) may be designated as XLAG, then the voltage appearing on conductor 101 varies according to the relation:

$$\Delta XS = GF \cdot XLAG \tag{2''}$$

where the term XLAG denotes the difference between the primary and secondary position command signals.

While the voltage $\Delta XS$ is always applied as an input to the amplifier $A_2$, this normally has no effect on the accumulator 100 inasmuch as the gate 105 is normally disabled. If one assumes, for the moment, that the gate 102 is enabled, then amplifier $A_2$ receives two input signals here labeled $XSCP_{i-1}$ and $\Delta XS$. The resistors associated with the amplifier $A_2$ are chosen such that:

$$\frac{R_{2f}}{R_{2a}} = \frac{R_{2f}}{R_{2b}} = 1 \tag{10}$$

Those skilled in the art will see that, with inversion of the amplifier $A_2$ and reinversion in the inverter 104, the input signal to the gate 105 is a voltage E which (with the gate 102 open) takes on a value according to the relation:

$$E = XSCP_{i-1} + \Delta XS \tag{3'}$$

Consider now the condition of the described apparatus during the time span when pulses appear on terminals $T_3$ to $T_9$ within one of the periods $\Delta T$, and assume that SH circuit 91 has been previously conditioned to produce at its output a dc. voltage labeled $XSCP_i$. The gate 92 is enabled by the inverter 96 in the absence of a pulse $T_2$ on terminal 98 so that SH circuit 92 is receiving on its input and producing at its output the same voltage $XSCP_i$ which exists on conductor 90. But the gates 102 and 105 are disabled so that the output voltage E from inverter 104 cannot influence SH circuit 91.

At the next time instant $T_o$, the primary position command voltage XCP will change by the amount $\Delta X$, as explained above. Then, at the subsequent instant when the pulse $T_2$ appears, gate 92 will open to isolate the input to SH circuit 94, and gates 102 and 105 will close to transmit signals therethrough. At this time, therefore, the output $\Delta XS$ from amplifier $A_1$ and appearing on conductor 101 will take on the value expressed by Equation (2'). Moreover, the voltage E produced by the summing amplifier $A_2$ and the inverter 104 will take on a value represented by Equation (3'), supra. Since the gate 105 is open, the voltage E will pass therethrough to the input of SH circuit 91 so that a new and incrementally updated value of the voltage $XSCP_i$ appears on the conductor 90. Because gate 92 is now disabled, this new value of the signal on conductor 90 does not influence the SH circuit 94. Yet, it will be apparent that during each of the successive instants $T_2$, the signal $XSCP_i$ on conductor 90 is iteratively updated or changed according to the previous-described relationship, viz:

$$XSCP_i = XSCP_{i-1} + \Delta XS = XSCP_i + GF (XCP - XSCP_{i-1}) \tag{3}$$

Therefore, as XCP changes by the primary increments $\Delta X$ during each period $\Delta T$, the secondary position command voltage $XSCP_i$ is changed by an auxiliary incremental amount $\Delta XS$, where the latter is proportional by a gain factor GF of less than one to the difference (XCP − XSCP) between the primary and secondary position command signals.

As a means for producing a dc. voltage which by its magnitude and polarity represents the actual position of the controlled member 14 (FIG. 1), the apparatus of FIG. 9 includes a potentiometer 110 energized from suitable positive and negative voltage sources and having a movable wiper 110a. The potentiometer may be of the well known helical configuration so that it may accommodate a relatively large travel of its wiper 110a and a relatively large variation in the dc. feedback signal XAP which appears on that wiper. As diagrammatically shown in FIG. 9, the wiper 110a is mechanically coupled (through reduction gearing not shown) to the lead screw 20 which is driven by the X axis servomotor 21 to move the saddle 16 carrying the controlled member 14 along the X axis. Thus, the potentiometer 110 of FIG. 9 represents a typical means for producing a dc. voltage XAP which at all times represents the actual position of the controlled member along the X axis.

In the apparatus of FIG. 9 an operational amplifier $A_3$ is employed to produce an error signal XPER which varies as the difference between the actual position XAP and the desired position represented by the secondary command signal $XSCP_i$. For this purpose, the signal XAP is fed via an input resistor $R_{3a}$ to the inverting input terminal of amplifier $A_3$, and the signal $XSCP_i$ is fed to the non-inverting input terminal through an input resistor $R_{3b}$. With a feedback resistor $R_{3f}$ sized to be equal to both $R_{3a}$ and $R_{3b}$, the output voltage XPER from the amplifier $A_3$ will vary according to the relation:

$$XPER = XSCP_i - XAP \tag{7}$$

Let it be assumed for the moment that a balance signal voltage $XBAL_i$ exists on a conductor 112 in FIG. 9. The creation of that voltage signal will be described below. To create a final velocity command signal XVC which will be utilized to energize the motor 21, a summing operational amplifier $A_5$ is coupled to receive three input voltages XPER, $XBAL_i$ and $\Delta XS$. These are respectively routed through input resistors $R_{5a}$, $R_{5b}$ and $R_{5c}$ to the inverting input of that amplifier which has a negative feedback resistor $R_{5f}$. To compensate for the inversion which appears in the amplifier $A_5$, an inverter 114 reinverts the output signal to produce the final velocity command voltage XVC. The resistors associated with amplifier $A_5$ are chosen to have the following relative values:

$$\frac{R_{5f}}{R_{5a}} = GPX; \quad \frac{R_{5f}}{R_{5b}} = 1; \quad \frac{R_{5f}}{R_{5c}} = GXFF \tag{11}$$

where GPX is a predetermined but adjustable gain factor to be applied to the XPER signal, and GXFF is a predetermined gain factor desired in connection with feed forward action. Those skilled in the art will immediately see, therefore, that the final dc. voltage XVC will vary in relation to the three input voltages according to the expression:

$$XVC = GPX \cdot XPER + XBAL_i + GXFF \cdot \Delta XS \tag{8'}$$

With the omission of the term XVCR as unnecessary, Equation (8') is fully tantamount to Equation (8) supra since replacement of $GXFF \cdot \Delta XS$ with the term XFDFD yields:

$$XVC = GPX \cdot XPER + XBAL_i + XFDFD \tag{8''}$$

Because the signal $\Delta XS$ is available from conductor 101 at all times, and since it periodically changes in the correct manner described above, it is readily available on input conductor 101a to produce the feed forward term XFDFD in Equation (8'').

The velocity command voltage XVC is passed through a final amplifier 35 to create the voltage $MV_x$ which is applied to the X axis servomotor 21 as fully described above. The motor 21 will drive the lead screw 20 to move the controlled member in a corresponding direction and at a corresponding speed so as to keep the controlled member essentially dynamically in agreement with the commanded signal $XSCP_i$ and thus to keep the error signal XPER essentially at zero except for a small following error which will exist during rapid movement.

In accordance with the present invention, the signal $XBAL_i$ is automatically changed so as to balance the servo system with zero position error whenever (i) no movement is being commanded because the signal $\Delta XS$ is zero and (ii) the position error is finite because of some spurious offset created, for example, by drift in the final amplifier 35. For this purpose, the apparatus of FIG. 9 includes means to produce a signal $XBAL_i$ which is incrementally changed during each of successive time periods $\Delta T$ by a small amount if the two conditions mentioned above are satisfied. More particularly, the amount of the incremental change in the balance signal XBAL during each period $\Delta T$ is made proportional to the then-existing position error XPER.

As here shown, the signal $XBAL_i$ is produced by an accumulator 120 which receives the error-representing voltage XPER via a conductor 121 and which is controlled by a zero-value detector 122 responsive to the voltage $\Delta XS$ appearing on conductor 101. The accumulator 120 is generally similar in its organization and operation to the accumulator 100. The former includes an SH circuit 124 which produces the signal $XBAL_i$ on its output conductor 112. That signal is fed back through a normally enabled gate 125 to the input of a second SH circuit 126 whose output is transmitted selectively through a normally disabled gate 128 and via an input resistor $R_{4a}$ to the inverting input of a summing operational amplifier $A_4$. The main input signal XPER is passed through a resistor $R_{4b}$ to the same inverting input of amplifier $A_4$, the latter having a feedback resistor $R_{4f}$ and passing its output signal through an inverter 130 to the input of the normally disabled gate 131 whose output leads to the input of SH circuit 124. The $T_3$ timing pulses coupled to a terminal 132 are passed through a normally closed gate 134 to a conductor 135; when it is enabled by a control signal applied thereto from the zero detector 122. Therefore, only when the signal $\Delta XS$ is zero and the gate 134 is enabled, timing pulses $T_3$ from the decoder 84 will appear on conductor 135 to enable gates 128 and 131 and, by the action of an inverter 136, to disable the normally open gate 125.

So long as the signal $\Delta XS$ is not zero and the signal $XSCP_i$ is being periodically changed to call for movement of the controlled member, the accumulator 120 is totally disabled by the gate 134 and the balance voltage $XBAL_i$ remains at its previously established value. If, however, the signal $\Delta XS$ is zero and the controlled member is supposedly at rest with a zero position error (that is, with XAP equal to $XSCP_i$ and XPER supposedly having a zero value), if the signal XPER has some finite value, this appears as a non-zero voltage input on line 121.

Then, at the instants when the pulses $T_3$ appear during each period $\Delta T$, the gate 125 will close to isolate the input of SH circuit 126, and the gates 128 and 131 will be enabled. The output of gate 128 thus becomes a voltage $XBAL_{i-1}$ representing the previously established value of the XBAL term. The resistors associated with amplifier $A_4$ are chosen to have the following relationships:

$$\frac{R_{4f}}{R_{4a}} = 1; \quad \frac{R_{4f}}{R_{4b}} = GBX \tag{12}$$

Under the assumed conditions, therefore, the output from the inverter 130 will take on a value $E'$:

$$E' = XBAL_{i-1} + GBX \cdot XPER \tag{13}$$

During each of the timing pulses $T_3$, the voltage $E'$ is passed by the gate 131 to the input of SH circuit 124 and that voltage $E'$ is thus stored as the new value for the signal $XBAL_i$. In the manner previously explained relative to the first embodiment, therefore, the signal on conductor 112 will be periodically updated according to the expression:

$$XBAL_i = XBAL_{i-1} + GBX \cdot XPER \tag{4}$$

If the final amplifier 35 should have spurious offsets which make its output $MV_x$ other than zero when its input is zero, the system of FIG. 9 will automatically adjust the voltage XBAL to progressively restore the position error to zero —in the fashion which has been previously described in connection with the first embodiment.

The apparatus illustrated and described in connection with FIG. 9 pertains solely to the X axis servo system. It will be understood, of course, that substantially identical components will be provided for the control of the Y axis servo.

RESUME'

From the foregoing, one may see that the present invention brings to the art of numerical control systems improvements which enhance the operation and reliability of final servo drives. If input signals to the numerical control system involve abrupt changes in axis velocities, the secondary position command signal, here changed by the auxiliary increment signal, will vary more gradually with time so that loss of control due to the limited capability for acceleration and deceleration by the driving power element is avoided. Moreover, inaccuracies due to drifting or other spurious offsets are automatically removed.

While the invention in one form may be practiced with a digital computer to carry out the signal processing steps and to form signal processing means, the invention may also be practiced in various analog embodiments typified by that described above in FIG. 9. Thus, the invention does not depend for its novelty or its application upon either a digital computer or a software program associated with a digital computer.

There follows as the terminal portion of this specification the Tables I and II referred to above and constituting program listings for the first embodiment here described.

TABLE I
Listing of Program Steps to Carry Out Flow Chart of FIG. 5

| STEP | | |
|---|---|---|
| (a) | Enter by Case A Clock Sweep Every 20 ms. | |
| $(b_j)$ $\{$ $(b_n)$ | Case A apparatus updates signals for $\Delta X$ and $\Delta Y$; then updates commanded position signals $\quad XCP_i = XCP_{i-1} + \Delta X$ $\quad YCP_i = YCP_{i-1} + \Delta Y$ | |
| 100. | CAR*; Read XCP | |
| 101. | Read* XSCP with SX* | ANS: XLAG = XCP − XSCP |
| 102. | Write* XLAG | |
| 103. | Read GF with MX* | |
| 104. | Write $\Delta$XS | |
| 106. | If ANS $\neq$ 0, proceed to 107 <br> If ANS = 0, jump to 110 | |
| 107. | Read XSCP | |
| 108. | Write XSCP | $(XSCP_i = XSCP_{i-1} + \Delta XS)$ |
| 109. | Jump to 114 | |
| 110. | CAR; Read GBX | |
| 111. | Read XPER with MX | |
| 112. | Read XBAL | |
| 113. | Write XBAL | $(XBAL_i = XBAL_{i-1} + GBX \cdot XPER)$ |
| 114. | CAR; Read GXFF | |
| 115. | Read $\Delta$XS with MX | |
| 116. | Write XFDFD | $(XFDFD = GXFF \cdot \Delta XS)$ |
| 117. | CAR; Read YCP | |
| 118. | Read YSCP with SX | |
| 119. | Write YLAG | |
| 120. | Read GF with MX | |
| 121. | Write $\Delta$YS | |
| 122. | If ANS $\neq$ 0, proceed to 123 <br> If ANS = 0, jump to 126 | |
| 123. | Read YSCP | |
| 124. | Write YSCP | |
| 125. | Jump to 130 | |
| 126. | CAR; Read GBY | |
| 127. | Read YPER with MX | |
| 128. | Read YBAL | |
| 129. | Write YBAL | |
| 130. | CAR; Read GYFF | |
| 131. | Read $\Delta$YS with MX | |
| 132. | Write YFDFD | |
| 133. | Exit until re-entry 20 ms. later | |

*NOTE: Symbol CAR designates "clear accumulator register".
Symbol ANS refers to output signaled by accumulator register.
Symbols SX and MX respectively designate "subtract" and "Multiply" commands to ALU. Absence of command designates "add".
"Read" means bring a signaled word from its storage to ALU input.
"Write" means transfer accumulator output to designated storage.

TABLE II
Listing of Program Steps To Carry Out Flow Chart of FIG. 6
Enter Every 2 ms.

| | | |
|---|---|---|
| 01. | ENTER | |
| 02. | CAR; Read $\Delta$XS, shift accum. right | $(ANS: \dfrac{\Delta XS}{10})$ |
| 03. | Read XSCPM | |
| 04. | Write XSCPM | $(XSCPM_i = XSCPM_{i-1} + \Delta XS/10)$ |
| 05. | Read XAP with SX | |
| 06. | Write XPER | $(XPER = XSCP_i - XAP)$ |
| 07. | Read GPX with MX | (ANS: GPX · XPER) |
| 08. | Read XFDFD | |
| 09. | Read XBAL | |
| 10. | Read XVCR | ANS: GPX · XPER + XFDFD + XBAL + XVCR |
| 11. | Write lower accum. digits to XVCR | |

TABLE II-continued
Listing of Program Steps To Carry Out Flow Chart of FIG. 6
Enter Every 2 ms.

12. Write upper accum. digits to XVC
13. CAR; Read ΔYS; shift accum. right
14. Read YSCPM
15. Write YSCPM
16. Read YAP with SX
17. Write YPER
18. Read GPY with MX
19. Read YFDFD
20. Read YBAL
21. Read YVCR
22. Write lower accum. digits to YVCR
23. Write upper accum. digits to YVC
24. EXIT, to re-enter 2 ms. later

We claim:

1. In a method of controlling the velocity and position of a member movable along an axis wherein a primary position command signal (XCP) is changed by incremental amounts ΔX during each of successive time periods, the improvement which comprises:
   a. producing a secondary position command signal,
   b. changing said secondary command signal at a rate which is proportional to the difference between the primary and secondary command signals, and
   c. utilizing said secondary command signal (XSCP) to excite servo power means to keep the actual position of said member substantially in agreement with the position represented by said secondary command signal.

2. The improved method set out in claim 1, further characterized in that said step (b) includes:
   b1. changing said secondary command signal during each period ΔT by an amount ΔXS which is a preselected fraction of the then-existing difference (XCP − XSCP) between the primary and secondary command signals.

3. In a system for controlling the velocity and position of a member movable along an axis to track the position represented by a primary command signal (XCP) which is changed by amounts ΔX during successive time periods ΔT, and wherein the magnitude of the amount ΔX may abruptly change, the improvement which comprises in combination:
   a. means for producing a secondary command signal (XSCP),
   b. means responsive to said primary and secondary command signals for producing an increment signal (ΔXS) proportional to the difference (XCP − XSCP) therebetween,
   c. means for changing said secondary command signal (XSCP) by an amount represented by said increment signal once during each period ΔT, and
   d. power servo means responsive to said secondary signal (XSCP) for moving said member to keep its position substantially in agreement therewith.

4. The combination set forth in claim 3 further characterized in that said means (b) include means for making said increment signal proportional to said difference by a predetermined proportionality factor which is less than 1.0.

5. The combination set forth in claim 3 further characterized in that said means (b) include means for updating said increment signal (ΔXS) according to the then-existing values of said primary and secondary command signals at a time instant within each of said periods ΔT.

6. In a system for controlling the velocity and position of a member movable along an axis, the combination comprising:
   a. means for producing a first signal (ΔX) designating an ideal desired velocity, such signal being abruptly and widely changeable from time to time,
   b. means for producing a second signal (XCP) designating an ideal desired position of the member,
   c. means responsive to said first signal for changing said second signal in a sense and at a rate corresponding to the sign and magnitude of the first signal,
   d. servo means responsive to a changeable input for moving said member to keep its actual position dynamically in substantial agreement with said input signal,
   e. means for producing a third signal (XSCP) designating a desired position of the member,
   f. means for changing said third signal at a rate proportional to, and in a sense corresponding to the sign of, the difference (XCP − XSCP) between the values of said second and third signals, and
   g. means for supplying said third signal as the input to said servo means (d).

7. The combination set forth in claim 6 further characterized in that said means (f) include means for making said rate proportional to said difference by a predetermined adjustable proportionality factor which is less than 1.0.

8. The combination set forth in claim 6 further characterized in that:
   c1. said means (c) includes means for changing said second signal (XCP) by the amount represented by said second signal (ΔX) during each of successive time periods ΔT, and
   f1. said means (f) includes means for changing said third signal (XSCP) during each said time period ΔT by an amount having a proportionality factor of less than 1.0 to said difference (XCP − XSCP).

9. The combination set forth in claim 8 wherein said means (f1) includes means for signaling a predetermined fraction 1/N of said amount proportional to said difference, and means for changing said third signal (XSCP) by said fractional amount N times during each said time period ΔT.

10. The combination set forth in claim 6 further characterized in that said means (d) includes:
   (d1). means for producing an actual position signal (XAP) which by its value represents the actual position of the controlled member,
   d2. means responsive to said actual position signal and said third signal for producing a position error signal (XPER), and d3. means for driving said member at a velocity and in a direction corresponding to the size and sense of said error signal.

11. In a system for controlling the velocity and position of a member movable along an axis, the combination comprising:
   a. means for measuring off successive periods $\Delta T$ in actual time,
   b. means for producing a primary commanded position signal (XCP) which by sign and magnitude represents the desired position of said member,
   c. means for producing a velocity increment signal ($\Delta X$) which by sign and magnitude represents the desired velocity ($\Delta X/\Delta T$) of said member,
   d. means for algebraically combining said position and velocity signals to iteratively update the former during each period $\Delta T$, such that $XCP_i = XCP_{i-1} + \Delta X$,
   e. means for producing a secondary position signal (XSCP),
   f. means for algebraically subtracting said secondary signal from said primary signal to produce an auxiliary velocity signal ($\Delta XS$) during each period $\Delta T$, so that $\Delta XS = GF (XCP - XSCP)$ where GF is a gain factor less than 1.0,
   g. means for algebraically combining said auxiliary signal and said secondary signal during each period $\Delta T$ to iteratively update the latter, such that $XSCP_i = XSCP_{i-1} + \Delta XS$, and
   h. position servo means responsive to said secondary position signal XSCP to keep the controlled member dynamically positioned susbstantially in accordance therewith,
whereby abrupt or wide changes in said velocity signal (XCP) result in more gradual changes in said secondary signal so as to permit said servo means more accurately to accelerate or decelerate the controlled member.

12. In a method for controlling the velocity and position of a member movable along an axis, wherein a position command signal (XSCP) is periodically changed by a variable increment amount ($\Delta XS$), and the position error (XPER) is signaled as the difference between the actual position of the member and the commanded position represented by said command signal (XSCP $-$ XAP), and a servo power means is excited with a signal which is a function of said error to drive said member along the axis in a direction to reduce such error toward zero, the means for exciting the servo power means being susceptible to offset drift, the improvement comprising:
   a. producing a compensating signal (XBAL),
   b. exciting said servo power means to run at a speed proprotional to an additive function of said signaled error (XPER) and the compensating signal (GPX·XPER + XBAL), and
   c. changing said compensating signal (XBAL) periodically by amounts which are proportional to the then-signaled error.

13. The method set forth in claim 12 further characterized in that said position command signal (XSCP) is changed during each of successive time periods $\Delta T$ by variable amounts ($\Delta XS$) which change from time to time, and wherein said step (c) includes:
   c1. changing said compensating signal (XBAL) during each of said periods $\Delta T$ by an amount which is a predetermined fraction of the then signaled error such that $XBAL_i = XBAL_{i-1} + GBX \cdot XPER$ where GBX is a predetermined number less than 1.0.

14. In a servo system which comprises:
   a. a member movable along a path,
   b. means for producing a first signal (XAP) indicative of the actual position of the member,
   c. means for producing a second signal (XSCP) indicative of the desired position of the member,
   d. means responsive to said first and second signals for producing a third signal (XPER) which is proportional to the error difference between the desired and actual positions of the member,
   e. means responsive to an input signal for driving said member along the path in a direction corresponding to the sign of such input signal, and
   f. means for coupling said third signal into said means (e) as said input signal, such means (f) being susceptible to spurious influences so as possibly to introduce into said input signal undesired offsets, whereupon the member's actual position is offset from the desired position when the input signal is reduced to zero by the closed loop servo action,
the improvement which is characterized by
   1. means for producing a fourth (XBAL) signal which is changeable in magnitude and sign,
   2. means for algebraically combining said fourth signal with said third signal and applying the resultant (XVC) to said means (f), and
   3. means for changing said fourth signal progressively whenever said third signal is not substantially zero,
whereby said fourth signal is automatically adjusted to eliminate any undesired offset between the desired and actual positions of said member.

15. The improved combination set forth in claim 14 wherein said means (3) includes means responsive to said third signal for changing said fourth signal at a rate proportional to the magnitude of the error difference represented by said third signal and in a sense corresponding to the sign of said third signal.

16. The improved combination set forth in claim 15 further including means for preventing the operation of said means (3) whenever said second signal is changing and holding said fourth signal at its last-achieved value.

17. In a servo system for keeping a movable member dynamically positioned substantially in agreement with a changeable commanded position signal. the combination comprising:
   a. means for producing a changeable position command signal (XSCP),
   b. means for producing an acutal position signal (XAP) representing the actual position of the member.
   c. means responsive to said command and actual position signals as inputs for producing a position error signal (XPER) proportional to the difference (XSCP $-$ XAP) between such inputs,
   d. means for driving said member is a direction and at a speed corresponding to the sign and magnitude of an input signal (XVC),
   e. means for producing a balance signal (XBAL),
   f. means responsive to said error signal and said balance signal for producing said input signal and applying it to said means (d), said input signal normally being proportional to the algebraic sum of said error and balance signals (XPER + XBAL) but such means (f) being susceptible of aging, drift and the like so as to create spurious offsets in said input signal causing it to depart from proportionality to said sum, and g. means for progressively increasing or decreasing said balance signal whenever said command signal is unchanging and said error signal is positive or negative and not substantially zero, thereby to compensate for said spurious offsets.

18. The combination set forth in claim 17 wherein said means (h) includes means for increasing or decreasing said balance signal at a rate which is proportional to the magnitude of said error signal.

19. The combination set forth in claim 17 wherein said means (e) includes a storage device for holding said balance signal at its last-achieved value so long as it is not being changed by said means (h).

20. In a servo system for keeping a movable member dynamically positioned substantially in agreement with a changeable commanded position signal, the combination comprising:

a. means fior producing a first changeable digital signal (XSCP) numerically representing a desired, commanded position, b. means for producing a second changeable digital signal ($\Delta$XS) numerically representing a changeable incremental distance, c. means for measuring off successive equal periods ($\Delta$T) in actual time, d. means for algebraically adding during each said period ($\Delta$T) said second signal ($\Delta$XS) to said first signal (XSCP) to cause the represented commanded position to change at a rate ($\Delta$XS/$\Delta$T) determined by the magnitude of said incremental distance, e. means physically coupled to said member for producing a third changeable digital signal (XAP) numerically representing the actual position of said member, f. means for algebraically substracting during each period ($\Delta$T) the third signal from the first signal to produce a fourth digital signal (XPER) numerically representing the error difference (XPER = XSCP − XAP) between the commanded and actual positions, g. means responsive to an input signal for driving said member in a direction and at a velocity corresponding to the sign and magnitude of such input signal, h. means for producing a fifth changeable digital signal (XBAL) representing a balance term, i. means for algebraically adding during each period ($\Delta$T) a changeable increment quantity of GBX.XPER to said fourth signal, where such quantity is proportional to the error difference represented by said fourth signal, so that said balance term changes at a rate and in a sense proportional to said error difference, j. means for inhibiting the operation of said means (i) except when said incremental distance represented by said second signals ($\Delta$XS) is substantially zero, k. means for algebraically combining said fourth and fifth signals during each period ($\Delta$T) to create a sixth digital signal (XVC) representing a compensated position error, and l. means for converting and coupling said sixth digital signals into an input signal applied to said means (g), whereby any spurious offsets introduced into said input signal by said means (1) are balanced out by changes in said fifth signals.

21. In a system for controlling the velocity and position of a member movable along an axis to track the position represented by a primary command signal (XCP) which is periodically changed by amounts $\Delta$X, the improvement which comprises in combination:

a. means for producing a secondary command signal (XSCP), b. means responsive to said primary and secondary command signals for producing an auxiliary signal ($\Delta$XS) which varies according to the difference (XCP − XSCP) between said command signals, c. means for changing said secondary command signal at a rate and in a sense corresponding to the magnitude and sign of said auxiliary signal, d. means for producing a feedback signal (XAP) which by its value represents the instantaneous actual position of the controlled member, e. means for producing an error signal (XPER) proportional to the difference (XSCP − XAP) between the secondary command signal and the feedback signal, f. means for producing a balance signal (XBAL), g. means for changing the balance signal in a sense and at a rate corresponding to the sign and magnitude of said error signal whenever said auxiliary signal is substantially zero, and h. power meas responsive to an algebraic sum function of said error and balance signals (XPER + XBAL) for driving said member at a velocity corresponding in magnitude and direction.

22. In a system for controlling the velocity and position of a member movable along an axis to track the position represented by a primary command signal (XCP) which is changed by amounts $\Delta$X during successive time priods $\Delta$T, the improvement which comprises in combination:

a. means for producing a secondary command signal (XSCP), b. means responsive to said primary and secondary command signals for producing an increment signal ($\Delta$XS) proportional by a factor of less than 1.0 to the difference (XCP − XSCP) therebetween, c. means for changing said secondary signal by the amount represented by the increment signal during each period $\Delta$T, so that $XSCP_i = XSCP_{i-1} + \Delta XS$, d. means for producing a feedback signal (XAP) which by its value represents the instantaneous actual position of the controlled member, e. means for producing an error signal (XPER) proportional to the difference (XSCP − XAP), between the secondary command signal and the feedback signal, f. means for producing a balance signal (XBAL), g. means for changing said balance signal by an amount proportional to the error signal (XPER) during each period $\Delta$T whenever said increment signal ($\Delta$XS) is substantially zero, so that $XBAL_i = XBAL_{i-1} + GBX \cdot XPER$, and h. power means responsive to the algebraic combination of said error and balance signals for driving said member at a velocity substantially proportional to such combination (XPER + XBAL).

23. The method set forth in claim 12 wherein said step (c) is performed only when said position command signal (XSCP) is not changing because said variable increment amount ($\Delta$XS) is zero.

24. The method set forth in claim 12 wherein an increment signal ($\Delta$XS) is produced to represent by its value said variable increment amount, and said step (b) includes:

b1. exciting said servo power means to run at a speed proportional to an additive function of said signaled error (XPER), the increment signal (ΔXS) and the compensating signal (XBAL), such total function (GPX·XPER + GXFF·ΔXS + XBAL) including gain factors of proportionality (GPX and GXFF) applied to the signaled error and the increment signal, the latter gain factor (GXFF) being no greater than 1.0.

* * * * *